(12) United States Patent
Hahm et al.

(10) Patent No.: US 9,137,665 B2
(45) Date of Patent: Sep. 15, 2015

(54) METHOD AND SYSTEM FOR ESTABLISHING WIRELESS LOCAL AREA NETWORK LINK BETWEEN PORTABLE TERMINALS

(71) Applicant: SAMSUNG ELECTRONICS CO., LTD., Suwon-si (KR)

(72) Inventors: Seongil Hahm, Yongin-si (KR); Youngri Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 13/854,346

(22) Filed: Apr. 1, 2013

(65) Prior Publication Data

US 2013/0276063 A1 Oct. 17, 2013

(30) Foreign Application Priority Data

Apr. 13, 2012 (KR) .................. 10-2012-0038408

(51) Int. Cl.
| | |
|---|---|
| H04L 29/06 | (2006.01) |
| H04W 12/08 | (2009.01) |
| H04W 12/04 | (2009.01) |
| H04W 84/12 | (2009.01) |

(52) U.S. Cl.
CPC .............. *H04W 12/08* (2013.01); *H04W 12/04* (2013.01); *H04W 84/12* (2013.01)

(58) Field of Classification Search
CPC ...... H04W 12/08; H04W 12/04; H04W 12/06
USPC .............................................. 726/3; 713/168
See application file for complete search history.

(56) References Cited

U.S. PATENT DOCUMENTS

| | | | | |
|---|---|---|---|---|
| 8,490,878 | B2 * | 7/2013 | Johnson et al. | 235/472.02 |
| 2003/0203746 | A1 * | 10/2003 | Iwase | 455/569.1 |
| 2006/0165060 | A1 * | 7/2006 | Dua | 370/352 |
| 2010/0211785 | A1 * | 8/2010 | Park et al. | 713/168 |

FOREIGN PATENT DOCUMENTS

WO 2005/029812 A1 3/2005

OTHER PUBLICATIONS

International Search Report dated Aug. 28, 2013 issued in International Application No. PCT/KR2013/003148 (PCT/ISA/210).
Park, et al; "WLAN Security: Current and Future", IEEE Computer Society, Oct. 2003, pp. 60-65, 7 sheets.

* cited by examiner

*Primary Examiner* — Jason Lee
(74) *Attorney, Agent, or Firm* — Sughrue Mion, PLLC

(57) ABSTRACT

A method of establishing a WLAN link between portable terminals using a cellular network and a sound, the method including: transmitting a connection request message including a first partial security key being a portion of a first security key to a second portable terminal through a cellular network by a first portable terminal; outputting a sound including a second partial security key being a remaining portion of the first security key after transmitting the connection request message; receiving a request of a WLAN connection including a second security key from the second portable terminal having received the sound through a WLAN; and establishing the WLAN link with the second portable terminal when the second security key corresponds to the first security key.

20 Claims, 13 Drawing Sheets

METHOD AND SYSTEM FOR ESTABLISHING WIRELESS LOCAL AREA NETWORK LINK BETWEEN PORTABLE TERMINALS

CROSS-REFERENCE TO RELATED APPLICATION

This application claims the priority from Korean Patent Application No. 10-2012-0038408, filed on Apr. 13, 2012 in the Korean Intellectual Property Office, the entire disclosure of which is hereby incorporated by reference.

BACKGROUND

1. Field

Apparatuses and methods consistent with exemplary embodiments relate to communicating through a wireless local area network (WLAN), and more particularly, to establishing a WLAN link between portable terminals with improved security stability while supporting convenience of WLAN connection.

2. Description of the Related Art

In recent years, with development of digital technology, mobile terminals, such as Personal Digital Assistant (PDA), electronic organizer, smart phone, tablet Personal Computer (PC), capable of processing communication and private information have been widely used. The portable terminals have various functions such as voice call, image call, message transmission such as Short Message Service (SMS)/Multimedia Message Service (MMS), electronic organizer, photographing, e-mail transceiving, broadcast playback, moving image playback, Internet, electronic commerce, music playback, schedule management, Social Networking Service (SNS), friend finder service, messenger, dictionary, game, WLAN link establishment, etc.

Meanwhile, the Institute of Electrical and Electronics Engineers (IEEE) 802.11 WLAN technology has made rapid progress, and the number of the WLAN users has been steadily increasing. Various encryption and authentication methods have been proposed to ensure security stability in WLAN communication.

For example, Wi-Fi Alliance (WFA) suggests Wi-Fi Protected Setup (WPS) to improve restriction on use. The WPS mainly includes a Personal Identification Number (PIN) method and a Push Button Configuration (PBC) method, and the PIN method must be legally implemented.

When using the WPS PIN method, the user inputs only a PIN number of 4 to 8 digits without selecting a security method to establish security connection. However, the user generates or inputs a PIN number through a complicated setting menu.

When a PBC button is implemented by software in the WPS PBC method, the user needs to find and press a button through a complicated menu. When the PBC button is implemented by hardware, if the user mistakes another button (e.g., reset button) for the PBC button, the device may erroneously operate. In addition, when a plurality of devices is connected to each other through WLAN, and the user wishes to operate all of the devices, the procedure becomes complicated, cumbersome, and time-consuming.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide a method of establishing a WLAN link between portable terminals capable of reinforcing security stability while supporting simple and rapid WLAN connection, and a system thereof.

One or more exemplary embodiments also provide a method capable of establishing a WLAN link between portable terminals using a cellular network and a sound output from the portable terminal, and a system for supporting the same.

One or more exemplary embodiments also provide a method of establishing a WLAN link between portable terminals capable of improving convenience, usability, and competitive force of the portable terminals by implementing optimal environments for establishing the WLAN link, and a system thereof.

In accordance with an aspect of an exemplary embodiment, there is provided a method of establishing a WLAN link in a portable terminal, the method including: transmitting a connection request message including a first partial security key being a part of a security key to a second portable terminal through a cellular network by a first portable terminal; outputting a sound including a second partial security key being a remaining of the second security key by the first portable terminal; acquiring the first partial security key through the connection request message and acquiring the second partial security key through the sound by the second portable terminal; requesting a WLAN connection to the first portable terminal using the first partial security key and the second partial security key by the second portable terminal; and establishing the WLAN link with the second portable terminal by the first portable terminal in response to a request of the WLAN connection.

In accordance with an of another exemplary embodiment, there is provided a method of establishing a WLAN link in a portable terminal, the method including: transmitting a connection request message including a first partial security key being a part of a security key to a second portable terminal through a cellular network by a first portable terminal; outputting a sound including a second partial security key being a remaining of the first security key after transmitting the connection request message; receiving a request of WLAN connection including a second security key from the second portable terminal having received the sound through a WLAN; and establishing the WLAN link with the second portable terminal when the second security key corresponds to the first security key.

In accordance with an aspect of another exemplary embodiment, there is provided a method of establishing a WLAN link in a portable terminal, the method including: receiving a connection request message from a contact server through a cellular network in a push scheme by a second portable terminal; turning-on a microphone for receiving reception of a sound output from a first portable terminal in response to the connection request message; receiving the sound output from the first portable terminal through the microphone; acquiring a first partial security key according to the connection request message and a second partial security key according to the sound; combining the second partial security key with the first partial security key to acquire a security key; and requesting WLAN connection to the first portable terminal using the acquired security key.

In accordance with an aspect of another exemplary embodiment, there is provided a computer-readable recording medium recording a program for executing the method by a processor.

In accordance with an aspect of another exemplary embodiment, there is provided a system for establishing a WLAN link including: a first portable terminal to initiate a service for establishing the WLAN link and to output partial security keys divided from a first security key for the WLAN connection through a connection request message and a sound, respectively; and a second portable terminal to turn-on a microphone in response to reception of the connection request message, to receive the sound through the microphone, and to request WLAN connection to the first portable terminal using the connection request message and partial security keys acquired from the sound.

In accordance with an aspect of another exemplary embodiment, there is provided a portable terminal including: a memory to store at least one program; and a controller to execute the at least one program to control such that a first portable terminal establishes a WLAN link with a second portable terminal, wherein the at least program includes commands for executing: transmitting a connection request message including a first partial security key being a part of a security key to a second portable terminal through a cellular network by a first portable terminal; outputting a sound including a second partial security key being a remaining of the first security key after transmitting the connection request message; receiving a request of WLAN connection including a second security key from the second portable terminal having received the sound through a WLAN; and establishing the WLAN link with the second portable terminal when the second security key corresponds to the first security key.

In accordance with an aspect of another exemplary embodiment, there is provided a portable terminal including: a memory to store at least one program; and a controller to execute the at least one program to control such that a first portable terminal establishes a WLAN link with a second portable terminal, wherein the at least program includes commands for executing: receiving a connection request message from a contact server through a cellular network in a push scheme by a second portable terminal; turning-on a microphone for receiving reception of a sound output from a first portable terminal in response to the connection request message; receiving the sound output from the first portable terminal through the microphone; acquiring a first partial security key according to the connection request message and a second partial security key according to the sound; combining the second partial security key with the first partial security key to acquire a first security key; and requesting WLAN connection to the first portable terminal using the acquired security key.

In accordance with an aspect of another exemplary embodiment, there is provided a computer-readable recording medium recording a program that transmits partial security keys divided from a first security key through a cellular network and a sound, respectively, combines the partial security keys received through the cellular network and the sound with each other to generate a second security key, and establishes a wireless local area network link using the first security key and the second security key.

BRIEF DESCRIPTION OF THE DRAWINGS

The above and/or other aspects will become more apparent by describing certain exemplary embodiments, with reference to the accompanying drawings, in which.

DETAILED DESCRIPTION OF EXEMPLARY EMBODIMENTS

Figure 1:
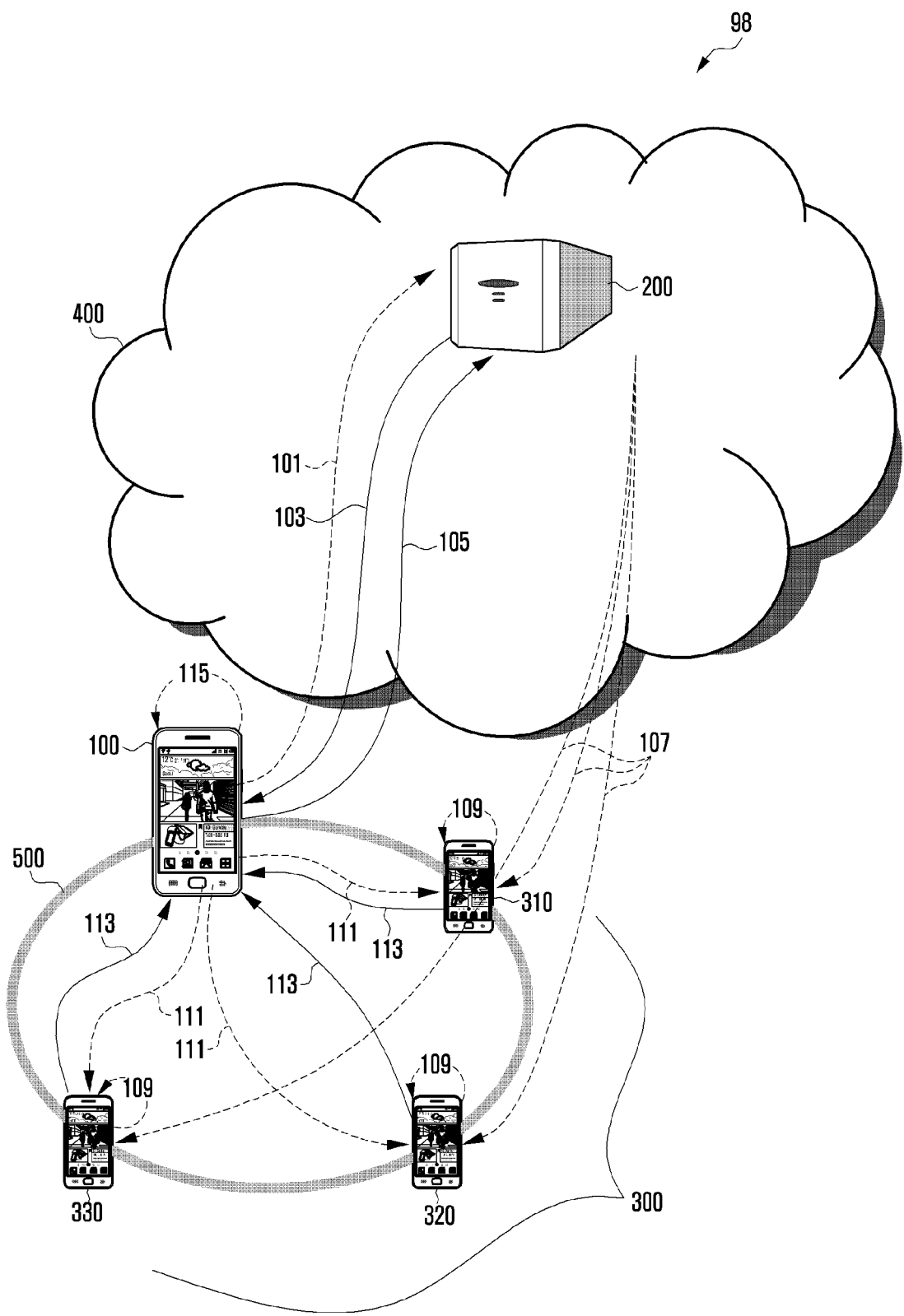
FIG. 1 is a schematic diagram illustrating a configuration of a system for describing an operation of establishing a WLAN link between portable terminals according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

An exemplary embodiment relates to a method and a system for connecting portable terminals to each other through a WLAN. An exemplary embodiment may support WLAN based connection between portable terminals using a cellular network and a sound. According to a WLAN connection method of an exemplary embodiment, convenience for a user may be improved by simplifying a procedure of the user according to WLAN connection while reinforcing security stability during the WLAN connection between portable terminals. In an exemplary embodiment, for example, the sound includes an audible frequency or a sound wave greater than the audible frequency, which refers to the sound below.

According to an exemplary embodiment, if a user of a transmitter portable terminal initiates a service for establishing the WLAN link, at least two partial security keys divided from a security key may be transmitted to a receiver portable terminal. The receiver portable terminal combines partial security keys received through a cellular network and a sound, and transmit the combined security key to the transmitter portable terminal. Then, the transmitter portable terminal may establish WLAN link between the transmitter portable terminal and the receiver portable terminal by authenticating the receiver using its security key and a received security key.

The portable terminal of an exemplary embodiment may include at least one of a wireless communication network for a cellular network, that is, a mobile communication network and a WLAN communication interface for a WLAN. The cellular network of an exemplary embodiment may use various types of networks such as 2nd Generation (2G), 3rd Generation (3G), 4th Generation (4G), Wideband Code Division Multiple Access (WCDMA), and Global System for Mobile communications (GSM), but an exemplary embodiment is not limited to a specific one.

Hereinafter, configurations of a system and a portable terminal and operation control methods thereof according to an exemplary embodiment will be described with reference to the accompanying drawings. Since the configurations of a system and a portable terminal and operation control methods thereof according to an exemplary embodiment are not limited to following embodiments, various embodiment are applicable based on following embodiments.

FIG. 1 is a schematic diagram illustrating a configuration of a system for describing an operation of establishing a WLAN link between portable terminals according to an exemplary embodiment.

As shown in FIG. 1, the system 98 includes a first portable terminal 100, a contact server 200, and one or more second portable terminals 300, for example, a portable terminal 310, a portable terminal 320, and a portable terminal 330. An exemplary embodiment illustrates an operation of establishing a WLAN link with at least one of the second portable terminals 300 by the first portable terminal 100. Establishing the WLAN link between two potable terminals means that the two portable terminals are connected to communicate with each other through the WLAN 500.

In an exemplary embodiment, the first portable terminal 100 may operate as an access point (AP), and the second portable terminals 300, for example, the portable terminal 310, the portable terminal 320, and the portable terminal 330 may operate as a Non-AP station. Although FIG. 1 shows three Non-AP stations such as the portable terminal 310, the portable terminal 320, and the portable terminal 330, it is apparent to a person having ordinary skill in the art that one or more Non-AP stations may be included.

The first portable terminal 100 may have a security key (hereinafter referred to as 'first security key' or 'source security key') for authenticating other party portable terminal for WLAN connection, and at least two partial security keys divided from the first security key. That is, the first portable terminal 100 may divide a first security key into two or more partial security keys according to user setting (or input). The first portable terminal 100 may transmit a part of at least two partial security keys to the second portable terminal 300 through the cellular network, and transmit a remaining of the partial security keys to the portable terminal 300 through a sound in order to reinforce security stability of a security key for establishing the WLAN link. The user previously has the first security key and the partial security keys or the first security key and the partial security keys may be generated every WLAN connection operation.

The portable terminal 100 may request contact information to the contact server 200 in response to a user request, and receive contact information provided from the contact server 200 to display a contact list. The contact information refers to user information of users registered in the contact server 200 by a user of the first portable terminal 100 or user information of users associated with the user of the first portable terminal 100 collected based on an SNS by the contact server 200, and may be implemented in various forms such as a phone number, a name, a nick name, and identification (ID). Particularly, in an exemplary embodiment, the contact list may include contact information of a user located at a neighboring zone of the user of the first portable 100. For example, the contact list may include a list of users present at the same zone (e.g., zone in coverage of a base station to which the first portable terminal 100 belongs) as that of the user of the first portable terminal 100 among users having specific relationship (relationship according to user setting of the first portable terminal 100 such as e.g., friends, acquaintances, family, colleagues).

If at least one contact information item is selected from the contact list, the first portable terminal 100 transmits a connection request message requesting WLAN connection with at least one second portable terminal 300 corresponding to at least one selected contact information item to the contact server 200 through the cellular network 400. The first portable terminal 100 may transmit the connection request message including one (hereinafter referred to as 'first partial security key') of the partial security keys and connection information, for WLAN connection. The first portable terminal 100 may load a remaining partial security key (hereinafter referred to as 'second partial security key') in a sound (e.g., sound wave, ultrasonic wave) and outputs the loaded sound through a speaker. The first portable terminal 100 may control the output of the sound according to an output level of a speaker by user setting.

The output level of the speaker may be determined according to a sound reach distance (or reach range) by the user setting. That is, the output level of the speaker may be provided by setting a reachable distance of the sound other than inputting the output level of the speaker. For example, the reachable distance of the sound may be variously set according to user setting, that is, 5 m, 25 m, 50 m, and 100 m. The first portable terminal 100 may determine the output level of the speaker according to the set reachable distance, and output the sound based on the determined output level of the speaker.

For example, an output level with respect to a reach distance of 5 m may be set to "A", an output level with respect to a reach distance of 25 m may be set to "B", an output level with respect to a reach distance of 50 m may be set to "C", and an output level with respect to a reach distance of 100 m may be set to "D". The output levels "A", "B", "C", and "D" determine an output level of a speaker of the portable terminal. As the reach distance is lengthened, magnitude of the output level may be increased. That is, for example, the output levels "A", "B", "C", and "D" may be defined in the order of "A<B<C<D".

When receiving a WLAN connection request from at least one second portable terminal 300, the first portable terminal 100 may confirm a security key (hereinafter referred to as 'second security key' or 'combination security key') from the second portable terminal 300 according to the WLAN connection request. That is, the second security key indicates a security key which is a combination of a first partial security key acquired through a cellular network by the second portable terminal 300 and a second partial security key acquired through the sound by the second portable terminal 300. The first portable terminal 100 may compare the second received security key with the first security key. The first portable terminal 100 may authenticate the second portable terminal 300 through comparison of the first security key and the second security key, and establish the WLAN link based on the authentication result.

When receiving a contact information request from the first portable terminal 100, the contact server 200 may identify the first portable terminal 100, and may collect contact information associated with the first portable terminal 100. For example, the contact server 200 may collect user information of users which a user of the first portable terminal 100 registers in the contact server 200 to acquire the contact information. The contact server 200 may collect user information of users related to the user of the first portable terminal 100 based on an SNS to acquire the contact information. The contact server 200 may transmit the contact information to the first portable terminal 100 in response to a request from the first portable terminal 100. Particularly, the contact server 200 may configure the contact information based on a location of the first portable terminal 100 among user information of all users specifically related to the user of the first portable terminal 100. That is, the contact server 200 may search the second portable terminal 300 located at the same zone (e.g., a zone in coverage of a base station to which the first portable terminal 100 belongs) as that of the first portable terminal 100 to configure the contact information. Accordingly, the contact server 200 may classify locations of respective portable terminals in units of networks (particularly, units of base stations) connected with a network. The contact server 200 may classify locations of the respective portable terminals using a location based service (e.g., friend finder service). The locations of the portable terminals may be classified by various mechanisms.

When receiving a connection request message requesting the WLAN connection with at least one second portable terminal 300 from the first portable terminal 100, the contact server 200 may transmit the connection request message to the at least one second portable terminal 300 through a cellular network 400. As described above, the connection request message includes connection information and a partial security key, and may be pushed to the at least one second portable terminal 300 in the push mechanism by the contact server 200. The push mechanism is generally known in a communication field, and thus a detailed description thereof is omitted.

The contact server 200 is specified as one server in an exemplary embodiment, but the contact server 200 may separately include a push server (not shown). For example, when receiving the connection request message from the first portable terminal 100, the contact server 200 may transfer the connection request message to the push server to request at least one second portable terminal 200 to push. Then, the push server may transmit the connection request message to the at least one second portable terminal 300 in a push mechanism.

When receiving the connection request message from the contact server 200 in the push mechanism, the second portable terminal 300 may acquire information of the first portable terminal 100 from connection information included in the connection request message, and may provide feedback to the respective user that a WLAN connection request is received from the first portable terminal 100. If the WLAN connection request is approved by the user, the second portable terminal 300 may turn-on a microphone in response to the connection request message, and may wait for reception of a sound provided from the first portable terminal 100. The second portable terminal 300 may acquire and store a first partial security key included in the connection request message.

If the sound output from the first portable terminal 100 is input through a microphone, the second portable terminal 300 may acquire a second partial security key included in the sound, and combine the second partial security key with the first partial security key to generate a second security key. The second portable terminal 300 may transmit a WLAN connection request using the second security key to the first portable terminal 100 through a WLAN 500, and may establish a WLAN link with the first portable terminal 100 according to a response of the first portable terminal 100.

The foregoing exemplary embodiment illustrates the first portable terminal 100, the contact server 200, and the second portable terminal constituting the system 98 according to an exemplary embodiment with reference to FIG. 1. Hereinafter, a method of establishing a WLAN link according to an exemplary embodiment will be described.

As shown in FIG. 1, the user may execute an application (hereinafter referred to as 'connection application') for establishing the WLAN link in the first portable terminal 100. Then, the first portable terminal 100 executes the connection application and request contact information to the contact server 200 through a cellular network 400 (operation 101).

The contact information refers to user information of users registered in the contact server 200 by a user of the first portable terminal 100 through the connection application or user information of users associated with the user of the first portable terminal 100 collected based on an SNS by the contact server 200, and may be implemented in various forms such as a phone number, a name, a nick name, and ID. The connection application may be a dedicated application for performing only a procedure of establishing a WLAN link according to an exemplary embodiment, and an application providing various services. For example, the connection application may be an application providing a mobile messenger service, an SNS, and a service playing multi-media contents.

When receiving a contents information request from the first portable terminal 100, the contact server 200 collects one or more contact information associated with the user of the first portable terminal 100, and transmits the collected contact information to the first portable terminal 100 (operation 103).

When receiving the contact information from the contact server 200, the first portable terminal 100 generates and displays a contact list based on the contact information so that the user may select at least one contact information item from the contact list. For example, the user may select contact information of the second portable terminal 300 such as at least one of the portable terminal 310, the portable terminal 320, and the portable terminal 330 from the contact list. Then, the first portable terminal 100 transmits a connection request message to the contact server 200 through a cellular network 400 in order to establish a WLAN link with the second portable terminal 300 (operation 105). The first portable terminal 100 may transmit the connection request message including connection information and first partial security key. The connection information may include information to establish the WLAN link with the first portable terminal 100, for example, a Service Set Identifier (SSID) of the WLAN 500, a channel number, other security information, and contact information according to user selection.

The WLAN link may include a WLAN connection mode such as an ad hoc mode and an infrastructure mode. That is, a selection menu for selecting one WLAN connection mode from the ad hoc mode and the infrastructure mode may be displayed on a screen of the first portable terminal so that the user may select one from the ad hoc mode and the infrastructure mode through the selection menu. The WLAN connection mode may be automatically determined according to a type of application. For example, when the application streams the music from the first portable terminal 100 to the second portable terminal 300 such as the portable terminal 310, the portable terminal 320, and the portable terminal 330, the infrastructure mode may be automatically selected. If the first portable terminal 100 and the second portable terminal 300 transmit their camera view (e.g., a photographed screen is displayed) to each other, the ad hoc mode may be automatically selected.

The ad hoc mode and the infrastructure mode with respect to the type of application may be selected by the user. The ad hoc mode or the infrastructure mode may be selected by the number of other portable terminals which may be connected to the first portable terminal 100. For example, when the first terminal 100 requests connection to a plurality of other portable terminals, the infrastructure mode may be selected. When the first portable terminal 100 requests connection to another portable terminal, the ad hoc mode may be selected. The ad hoc mode and the infrastructure mode may be selected in the first portable terminal 100 by various methods.

If the WLAN connection mode is selected by one of the foregoing mechanisms, the first portable terminal 100 may execute a function as an AP, and the connection information of the connection request message may include mode information indicating whether to establish the WLAN link in the ad hoc mode or the infrastructure mode. The connection request message of an exemplary embodiment will be described in detail with reference to FIG. 2 below.

The user for the first portable terminal 100 may not only establish the WLAN link but also execute a specific connection application in the second portable terminal 300.

For example, when the connection application currently executed in the first portable terminal 100 is a chatting application providing a chatting service, the user of the first portable terminal 100 may execute the same chatting application in the second portable terminal 300 to enjoy a chatting service with the user of the second portable terminal 300 through the WLAN 500. The user of the first portable terminal 100 may wish to execute a music playback application of the second portable terminal 300 to play a music file stored in the first portable terminal 100 in the second portable terminal 300 through the WLAN 500 in a streaming operation. The connection information of the connection request message may include an ID indicating a specific connection application. The ID may be mapped to the same connection application by the first portable terminal 100 and the second portable terminal 300, and may be generated from the first portable terminal 100 or be extracted from a corresponding connection application.

Referring back to FIG. 1, when receiving a connecting request message from the first portable terminal 100, the contact server 200 transmits the connection request message to at least one second portable terminal 300 in a push mechanism (operation 107). The system 98 may include a push server (not shown) implemented separately or within the contact server 200. The contact server 200 may transfer the connection request message to the push server (not shown), and request the push server to transmit the connection request message to the second portable terminal 300 in the push mechanism. Then, the push server (not shown) may push the connection request message to the second portable terminal 300 through the cellular network 400.

When receiving the connection request message, the second portable terminal 300 may display a selection menu confirming whether to establish the WLAN link with the first portable terminal 100, that is, whether to connect with the first portable terminal 100 through the WLAN 500, on a screen. The user of the second portable terminal 300 approves connection through the selection menu, the second portable terminal 300 turns-on a microphone and waits for reception of a sound output from the first portable terminal 100 (operation 109). The second portable terminal 300 may acquire and manage a first partial security key included in the connection request message.

The first portable terminal 100 transmits the connection request message, loads a second partial security in the sound, and outputs the loaded sound through the speaker (operation 111). The first portable terminal may output a sound according to a preset output level (e.g., output intensity according to a reach distance of the sound) of the speaker.

When the sound output from the first portable terminal 100 through the turned-on microphone is input, the second portable terminal 300 acquires a second partial security key included in the sound, and combines the second partial security key with the first partial security key to generate a second security key. The second portable terminal 300 request WLAN connection to the first portable terminal 100 through a WLAN interface using the used connection information of the connection request message and the second security key (operation 113).

The second portable terminal 300 may request the WLAN connection to the first portable terminal 100 using one of a cellular network and a WLAN. When a WLAN function is turned-off, the second portable terminal 300 may activate the WLAN function when an input approving connection through the selection menu is received or the sound is received through the microphone. In addition, the second portable terminal 300 may extract a connection application ID from the connection information of the connection request message, and may search and execute a connection application indicated by the connection application ID. That is, according to an exemplary embodiment, when the connection application ID is included in the connection information, the portable terminal for supporting a function establishing a WLAN link may execute a corresponding connection application. Accordingly, the second portable terminal 300 may receive contents from the first portable terminal 100 through the connection application. For example, when the connection application ID is included in the received connection information, the second portable terminal 100 may execute a music playback application indicated by the connection application ID to play a music file streamed by the first portable terminal 100.

Referring back to FIG. 1, when receiving a WLAN connection request from the second portable terminal 300 through the WLAN 500 based on the second security key, the first portable terminal 100 may compare the second security key with a first security key which the first portable terminal 100 has, and may authenticate the second portable terminal 300 requesting the establishment of the WLAN link (operation 115). The first portable terminal 100 may establish the WLAN link with the second portable terminal 300 having transmitted a corresponding second security key, and may transmit data according to a user request through the WLAN 500.

As described above, according to an exemplary embodiment, the user of the first portable terminal 100 may establish the WLAN link without a complicated setting procedure only by selecting contact information from a user-friendly contact list. The user of the second portable terminal 300 may establish the WLAN link without the complicated setting procedure by only an operation of pushing a connection request button in a selection menu displayed on a screen according to the connection request message. According to an exemplary embodiment, with respect to the security key for establishing the WLAN link, a first one security key is divided into a first partial security key and a second partial security key, and the first partial security key and a second partial security key are provided separately through the cellular network and the sound so that security stability may be reinforced.

Figure 2:
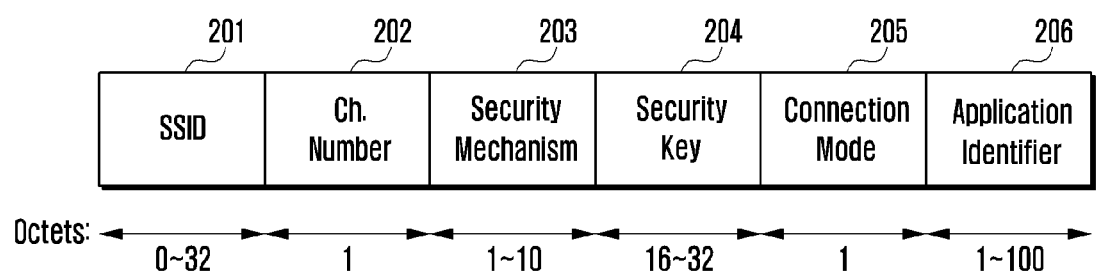
FIG. 2 is a schematic diagram illustrating an example of a connection request message format according to an exemplary embodiment.

FIG. 2 is a schematic diagram illustrating an example of a connection request message format according to an exemplary embodiment.

Referring to FIG. 2, the connection request message includes an SSID field 201, a channel number field 202, a security mechanism field 203, a security key field 204, a connection mode field 205, and an application identifier (ID) field 206. Under this arrangement, as described above, the connection information (e.g., SSID, channel number, other security information, application ID, and contact information according to user selection) and a partial security key may be provided. As described above, the connection request message is transmitted to the second portable terminal 300 through the cellular network 400 by the first portable terminal 100, and is used to establish a WLAN link between the first portable terminal 100 and the second portable terminal 300.

The SSID field 201 indicates an SSID of a WLAN 400 to which the first portable terminal 100 belongs.

The channel number field 202 indicates through which wireless channel the second portable terminal 300 establishes a WLAN link with the first portable terminal 100 in the WLAN 400 designated by the SSID field 210.

The security mechanism field 203 indicates a security mechanism to be applied to the WLAN link between the first portable terminal 100 and the second portable terminal 300. For example, the security mechanism field may designate a security mechanism such as Wired Equivalent Privacy (WEP), Wi-Fi Protected Access (WPA), and Wi-Fi Protected Access2 (WPA2), and may designate an open scheme which does not use a separate security mechanism.

A security key for ensuring security stability in a WLAN link between the first portable terminal 100 and the second portable terminal 300 is recorded in the security key field 204. Particularly, a partial security key divided from the first security key of the first portable terminal 100 is recorded in the security key field 204, and the first portable terminal 100 authenticates the second portable terminal 300 using a security key which is a combination of the partial security key and another partial security key transmitted through the sound.

The connection mode field 205 contains information indicating through which mechanism the first portable terminal 100 and the second portable terminal 300 establish the WLAN link. As described above, the mode information may indicate an infrastructure mode or an ad hoc mode.

An application ID indicating which connection application is executed after the second portable terminal 300 receives the connection request message is recorded in the application ID field 206. The application ID field 206 may include metadata of contents which the first portable terminal 100 transmits to the second portable terminal 300 through a corresponding connection application except for a connection application which the second portable terminal 300 will execute. A title, a singer name, and a music playback time of a music file which the first portable terminal 100 will stream to the second portable terminal 300 may be recorded in the application ID field 206.

If the connection request message is received, the second portable terminal 300 executes a specific connection application with reference to the application ID field 206, and performs data communication with the first portable terminal 100 through the connection application. For example, the second portable terminal 300 may execute a music playback application with reference to the application ID field 206 included in a connection request message, and may play a music streamed through the WLAN link from the first portable terminal 100.

Respective fields of the connection request message may be transmitted at different times through a separate message. For example, after the application ID and metadata of contents are transmitted to the second portable terminal 300, if the user of the second portable terminal 300 approves connection through the WLAN 500, remaining information may be transmitted to the second portable terminal 300. After establishment of the WLAN link is terminated, the application ID or contents metadata recorded in the application ID field 206 may be transmitted to the second portable terminal 300.

Since a format of the connection request message shown in FIG. 2 is one example, a part of fields 201 to 206 shown in FIG. 2 may be omitted according to an implementation, and a new field which is not shown in FIG. 2 may be added. For example, the format of the connection request message may include a message type field indicating a type of connection request message and a contact information field indicating desired contact information of a portable terminal. Lengths of fields in units of octets shown in FIG. 2 may be changed.

Figure 3:
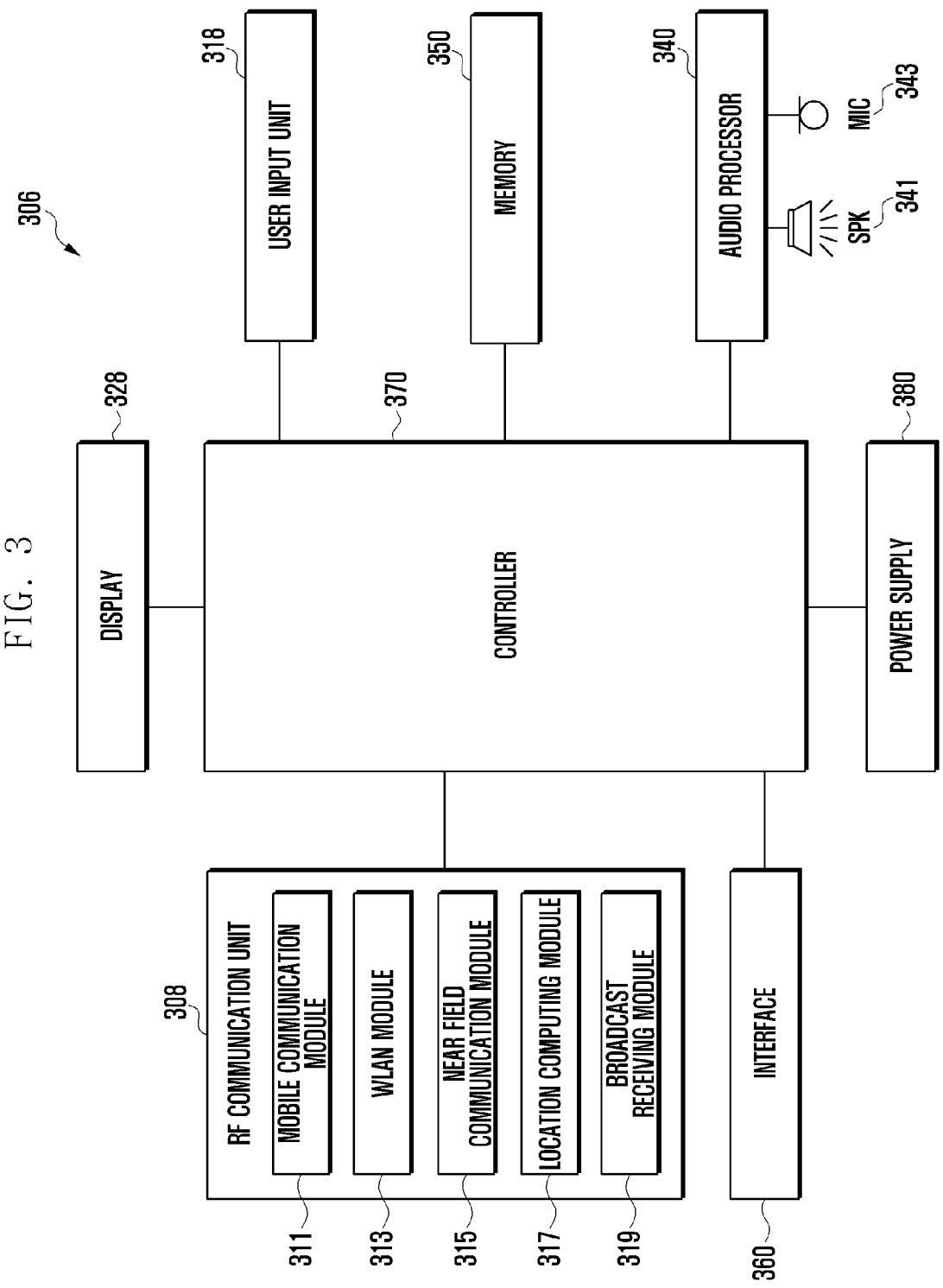
FIG. 3 is a block diagram schematically illustrating a configuration of a portable terminal according to an exemplary embodiment.

FIG. 3 is a block diagram schematically illustrating a configuration of a portable terminal 306 according to an exemplary embodiment. The portable terminal 306 may represent the first portable terminal 100 and/or the second portable terminal 300, and a configuration of FIG. 3 may be implemented in both of the first portable terminal 100 and the second portable terminal 300.

Referring to FIG. 3, the portable terminal 306 includes a radio frequency (RF) communication unit 308, a user input unit 318, a display 328, an audio processor 340, a memory 350, an interface 360, a controller 370, and a power supply 380. The portable terminal may include more or fewer elements than those shown in FIG. 3.

The RF communication unit 308 may include at least one module which enables wireless communication between the portable terminal and a wireless communication system or between the portable terminal and a network in which the portable terminal is located. For example, the RF communication unit 308 may include a mobile communication module 311, a WLAN module 313, a near field communication module 315, a location computing module 317, and a broadcast receiving module 319.

The mobile communication module 311 transceives a wireless signal with at least one of a base station, an external terminal, and a server over a mobile communication network. The wireless signal may include a voice call signal, an image call signal or data of various formats according to transceiving of character/multi-media message. Particularly, the mobile communication module 311 may transmit and receive a partial security key through the cellular network.

The WLAN module 313 is a module to connect with a wireless Internet and establish a WLAN link with another portable terminal, and may be installed inside or outside the portable terminal. WLAN (Wi-Fi), Wireless broadband (Wibro), World Interoperability for Microwave Access (Wimax), High Speed Downlink Packet Access (HSDPA) may be used as a wireless Internet technology. Particularly, the WLAN module 313 performs communication associated with an operation of establishing the WLAN link.

The near field communication module 315 is a module for near field communication. Bluetooth, Radio Frequency ID (RFID), infrared Data Association (IrDA), Ultra Wideband (UWB), ZigBee, or Near Field Communication (NFC) may be used as a short range communication technology.

The location computing module 315 is a module for acquiring a location of the portable terminal. A Global Position System (GPS) is a representative example of the location computing module 315. The location computing module 315 computes distance information from at least three base stations and exact time information, applies triangulation to the computed distance and time information to compute three dimensional current location information according to the latitude, the longitude, and the height. The location computing module 315 may continuously receive a current location of the portable terminal from at least three satellites to compute location information. The location information of the portable terminal may be acquired by various methods.

The broadcast receiving module 319 receives a broadcast signal (e.g., TV broadcast signal, radio broadcast signal, data broadcast signal) and/or information (e.g., a broadcast channel, information associated with a broadcast program or a broadcast service provider) associated with the broadcasting from an external broadcast management server through a broadcast channel (e.g., satellite channel, terrestrial channel). Particularly, a digital broadcast signal received through the broadcast receiving module 319 of the first portable terminal 100 may be broadcasted to the second portable terminal 300.

The user input unit 318 allows the user to generate input data for controlling an operation of the portable terminal. The user input unit 318 may be a key pad, a dome switch, a touch pad (constant pressure/capacitive), a jog wheel, or a jog switch.

The display 328 displays (outputs) information processed by the portable terminal. For example, when the portable terminal is in a call mode, the display 328 displays User Interface (UI) or Graphical UI (GUI). When the portable terminal is in an image call mode or a shooting mode, the display 328 displays a shot, a received image, a UI, and/or a GUI. Particularly, the display 328 displays UI or GUI associated with an operation of establishing the WLAN link. A screen arrangement of the display 328 and an example of a screen thereof according to an exemplary embodiment will be described below.

The display 328 may include at least one of a liquid crystal display (LCD), a thin film transistor-liquid crystal display (TFT LCD), a Light Emitting Diode (LED), an organic LED (OLED), an Active Matrix OLED (AMOLED), a flexible display, a bended display, and a 3D display. Some of the above displays may be configured in a transparent type or a light transmittance type to look out the outside therethrough.

According to an exemplary embodiment, when a touch panel (hereinafter, referred to as 'touch screen' for sensing a touch operation and the display 328 are constructed in a layer structure, the display may be used as the input unit as well as the output unit.

The touch panel may be configured to convert a pressure applied to a specific portion of the display or a variation of capacitance generated from the specific portion of the display 328 into an electrical input signal. The touch panel may be configured to detect a pressure when touching the display as well as the touched location and area.

When the touch input is generated with respect to the touch panel, the signal corresponding to the touch input is transferred to a touch controller. The touch controller processes the signal and transfers data corresponding to the signal to the controller 370. Thus, the controller 370 may recognize which area is touched in the display 328.

The audio processor 340 transmits an audio signal from the controller 370 to the speaker 341. The audio processor 340 transfers an audio signal such as a voice from the microphone 343 to the controller 370. The audio processor 340 converts voice/sound data into an audible sound through the speaker 341 under the control of the controller 370 and outputs the audible sound. The audio processor 340 may convert an audio signal such as a voice from the microphone 343 into a digital signal and transfer the digital signal to the controller 370. Particularly, the audio processor 340 according outputs a sound including a partial security key through the speaker 341 under the control of the controller 370. Upon output of a sound including the partial security key through the speaker 341, the audio processor 340 processes output to correspond to an output level of the speaker set under the control of the controller 370. At least one of the audio processor 340 and the speaker 341 may include an additional circuit and electronic component (e.g., resistor, capacitor) so that the sound is input to another portable terminal located at a neighboring region, through a microphone of the another portable terminal.

The speaker 341 may receive audio data from the RF communication unit 308 or output audio data stored in the memory 350 in a call mode, a record mode, a voice recognition mode, and a broadcast receiving mode. The speaker 341 may output a sound signal associated with a function (e.g., a call signal receiving sound, a message receiving sound, a music file playback) executed by the portable terminal. Particularly, the speaker 341 output a sound into which the partial security key is loaded according a preset output level.

The microphone receives an external sound signal and processes it as electric voice data is in a call mode, a record mode, and a voice recognition mode. When the portable terminal in the call mode, the processed voice data are converted into a transmittable form through the mobile communication module 311 and output to a mobile communication base station. Various noise removal algorithms for removing a noise occurring during a procedure of receiving an external sound signal may be implemented in the microphone 343. For example, the microphone 343 may receive a sound from a speaker of another portable terminal and transfer the received sound to the controller 370.

The memory 350 may store a program for operating the control unit 370 and may temporarily store input/output data (for example, a phone book, a message, audio, a still image, electronic book, a moving image, a sound, partial security key). The memory 350 may store data about vibrations and audio of various patterns output when a touch input occurs on the touch screen. Particularly, the memory 350 may store a first security key, a first partial security key acquired from a connection request message received through a cellular network 400, and a second partial security key acquired from a sound received from a microphone.

The memory 350 may include a storage medium having at least one type of a flash memory type, a hard disk type, a micro type, a card type of a memory (for example, an SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), MRAM (Magnetic RAM), a magnetic disc, and an optical disc. The portable terminal may operate associated with a web storage executing a storage function of the memory 350 in an Internet.

The interface 360 serves as a path to connect various external devices to the portable terminal. The interface 360 may receive data or power from an external device, transfer the data or power to each element in the portable terminal, or transmit data of the voice recognition function to an external device. For example, the interface 360 may include a wired/wireless headset port, an external charger port, a wired/wireless data port, a memory card port, a port of connecting a device having an identity module, an audio input/output (I/O) port, a video I/O port and an earphone port.

The controller 370 controls an overall operation of the portable terminal. For example, the controller 370 performs control and processing associated with a voice call, data communication, and an image call. The controller 370 may include a multi-media module for playing multi-media. The multi-media module may be implemented inside or separately from the controller 370. Particularly, the controller 370 performs overall control for an operation establishing a WLAN link. Upon establishment of a WLAN link, the controller 370 may control an operation of a transmitter portable terminal (e.g., first portable terminal 100) starting a service. Upon reception of the connection request message, the controller 370 may turn-on the microphone 343 to control an operation of a receiver portable terminal (e.g., second portable terminal 300) receiving a sound of the transmitter portable terminal.

First, a case where the portable terminal operates as the transmitter portable terminal is described.

If the user executes a connection application, the controller 370 acquires contact information from the contact server 200, and controls display of a contact list based on the acquired contact information. When the contact information is selected from the contact list, the controller 370 may generate and transmit a connection request message including connection information and a part of a first partial security key divided from the first security key to the contact server 200. After transmitting the connection request message, the controller 370 loads a remaining part of the first security key, i.e., a second partial security key, divided from the first security key into a sound, and outputs the loaded sound through the speaker 341. The controller 370 may control output of the sound based on a preset output level.

Upon reception of a WLAN connection request including the second security key from one or more receiver portable terminals after the output of the sound, the controller 370 compares the second security key with the first security key to authenticate the receiver portable terminal.

Next, a case where the portable terminal operates as the receiver portable terminal will be described.

If the connection request message is pushed from the contact server, the controller 370 may control display a selection menu to confirm whether to establish a WLAN link with the transmitter portable terminal through the display 328. If the user approves connection through the selection menu, the controller 370 may control turning-on of the microphone 343. The controller 370 may extract and manage a first partial security key from the connection request message.

When the sound output from another portable terminal is input through the turned-on microphone, the controller 370 may extract the second partial security key from the input sound. The controller 370 may combine the second partial security key acquired from the sound with the first partial security key acquired from the connection request message to generate a second security key. The controller 370 requests WLAN connection to the transmitter portable terminal using the connection information and the second security key of the connection request message, and controls a procedure of establishing a corresponding WLAN link. When a WLAN function is turned-off, the controller 370 may activate the WLAN function when an input approving connection through the selection menu is received or a sound is received through the microphone 343.

The power supply 380 uses power which is applied from an external power source or an internal power source and supplies the power to operate each constituent element to each constituent element, under control of the controller 370.

Exemplary embodiments may be implemented in a recording medium capable of being read by a computer or a similar device using software, hardware, and a combination thereof. According to hardware implementation, exemplary embodiments may be realized using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for performing other functions. In some cases, exemplary embodiments described in the specification may be implemented by the controller 370. According to software implementation, exemplary embodiments such as procedures and functions described in the specification may be realized by separate software modules. Each of the software modules may perform at least one function and operation described in the specification.

The portable terminal shown in FIG. 3 may include various devices using Application Processor (AP), Graphic Processing Unit (GPU), and Central Processing Unit (CPU) such as various information communication device, multi-media devices, and application devices thereof supporting exemplary embodiments. For example, the network electronic device includes electronic devices such as PC, Smart Phone, digital camera, Portable Multimedia Player (PMP), media player, portable game terminal, laptop computer, and PDA as well as mobile communication terminals operating based on respective communication protocols corresponding to various communication systems. In addition, a control method of an exemplary embodiment may be applied to various display devices such as Digital Television (DTV), Digital Signage (DS), and Large Format Display (LFD).

Figure 4:
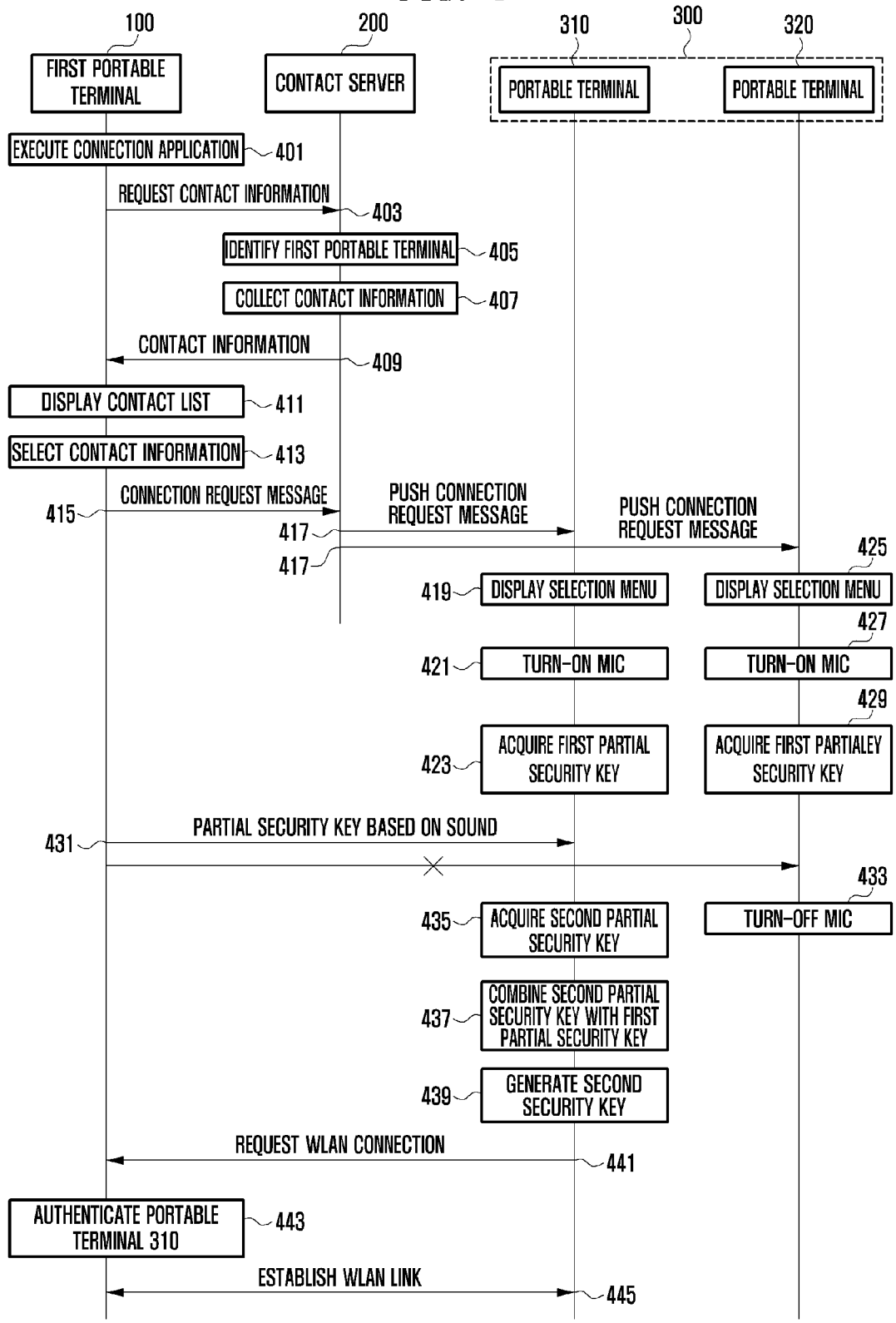
FIG. 4 is a signal flow chart illustrating a method of establishing a WLAN link between a first portable terminal and a second portable terminal according to an exemplary embodiment.

FIG. 4 is a signal flow chart illustrating a method of establishing a WLAN link between a first portable terminal 100 and a second portable terminal 300 according to an exemplary embodiment.

Referring to FIG. 4, a first portable terminal 100 executes a connection application in response to a user request (operation 401), and requests contact information from a contact server 200 through a cellular network 400 (operation 403).

Upon reception of a request of the contact information from the first portable terminal 100, the contact server 200 may identify the first portable terminal 100 (operation 405), and collect contact information related to a user of the first portable terminal 100 (operation 407). The contact information may be user information which the user of the first portable terminal 100 registers in the contact server 200 or user information related to the user of the first portable terminal 100 collected by the contact server 200 based on an SNS. The contact server 200 may transmit the collected contact information to the first portable terminal 100 (operation 409).

Upon reception of the contact information from the contact server 200, the first portable terminal 100 displays a contact list based on the received contact information (operation 411), and receives selection of at least one contact information item from the contact list (operation 413). If the contact information is selected, the first portable terminal 100 may transmit a connection request message for establishing a WLAN link to a contact server 200 through a cellular network 400 (operation 415). If the contact information is selected from the user, the first portable terminal 100 may divide a first security key stored or newly generated into a first partial security key and a second partial security key. The first portable terminal 100 may transmit the connection request message including connection information for establishing the WLAN link and a part (e.g., first partial security key) of at least two partial security keys divided from the first security key.

When receiving the connection request message from the first portable terminal 100, the contact server 200 may transmit the received connection request message to at least one second portable terminal 300, for example, portable terminal 310 and portable terminal 320, in a push mechanism (operation 417). The contact server 200 identifies a first portable terminal 100 having transmitted the connection request message, and parses a message from the first portable terminal 100 to confirm a type of the received message. The type of the received message may be confirmed from message type information in the received message. When the type of the received message corresponds to the connection request message for establishing a WLAN link with the second portable terminal 300, the contact server 200 may identify the second portable terminal 300 based on the contact information included in the connection request message. FIG. 4 illustrates a case where the portable terminal 310 and the portable terminal 320 are identified by way of example. Accordingly, the contact server 200 may push the connection request message to the identified portable terminal 310 and portable terminal 320.

When receiving the connection request message from the contact server 200, the portable terminal 310 and the portable terminal 320 may display a selection menu for confirming whether to establish the WLAN link with the first portable terminal 100, respectively (operations 419 and 425). If the user approves connection through the selection menu, the portable terminal 310 and the portable terminal 320 may turn-on a microphone 343, respectively (operations 421 and 427). Upon reception of the message from the contact server 200, the portable terminal 310 and the portable terminal 320 may confirm a type of the received message through message parsing. The type of the received message may be confirmed from message type information included in the message. When the type of the received message corresponds to the connection request message for establishing the WLAN link, the portable terminal 310 and the portable terminal 320 may turn-on the microphone 343 and wait for reception of the sound in response to the connection request message. Upon reception of the connection request message, the portable terminal 310 and the portable terminal 320 may extract and manage connection information and a partial security key (first partial security key) included in the connection request message (operations 423 and 429).

The first portable terminal 100 may transmit the connection request message and output a sound including a remaining partial security key (second partial security key) of the at least two partial security keys divided from the first security key after a predetermined time through the speaker 341 (operation 431). The predetermined time may be variously defined as 5 seconds, 10 seconds, 15 seconds, and 30 seconds according to user setting. The first portable terminal 100 may output a sound with the second partial security key according to an output level of the speaker 341 corresponding to a preset reach time.

For example, the sound output from the first portable terminal 100 reaches the portable terminal 310, and does not reach the portable terminal 320. That is, it is assumed that the portable terminal 310 is located within a sound reach range and the portable terminal 320 is located beyond the sound reach range based on a location of the first portable terminal 100. Accordingly, the sound including the second partial security key output from the first portable terminal 100 is input to only the portable terminal 310 through the microphone 343, but is not input to the portable terminal 320.

When the sound including the second partial security key from the first portable terminal 100 is not input until a predetermined time elapses after turning on of the microphone 343, the portable terminal 320 may turn-off the microphone 343 (operation 433). If a sound without the second partial security key is received from another portable terminal in a state that the microphone 343 is turned-on, the portable terminal 320 may disregard a corresponding sound and turn-off the microphone 343 after a predetermined time (e.g., 30 second, 1 minutes, 5 minutes) elapses. If the sound is input through the microphone 343, the portable terminal 310 may acquire the second partial security key loaded in the sound (operation 435). When acquiring the second partial security key, the portable terminal 310 combines the second partial security key acquired through the sound with the first partial security key acquired through the connection request message (operation 437) to generate one security key (operation 439). The portable terminal 310 may request a WLAN connection to the first portable terminal 100 using the connection information and the second security key of the connection request message (operation 441).

Upon reception of the WLAN connection request from the portable terminal 310, the first portable terminal 100 may authenticate the portable terminal 310 (operation 443). The first portable terminal 100 may compare the second received security key with the first security key included in the first portable terminal 100 to authenticate the portable terminal 310 according to presence of correspondence thereof.

When the second security key corresponds to the first security key, the portable terminal 100 may establish the WLAN link with the portable terminal 310 (operation 445). For example, the first portable terminal 100 may transmit a response accepting establishment of the WLAN link to the portable terminal 310 to establish the WLAN link in response to a request of establishment of the WLAN link of the portable terminal 310.

In the foregoing exemplary embodiment, the first portable terminal 100 acquires the contact information from the contact server 200 in operations 403 to 409, but procedures of requesting and receiving the contact information of operations 403 to 409 may be omitted. For example, upon execution of a connection application (operation 401), the first portable terminal 100 displays a contact list (operation 411) based on stored contact information and performs remaining operations 413 to 445.

Figure 5:
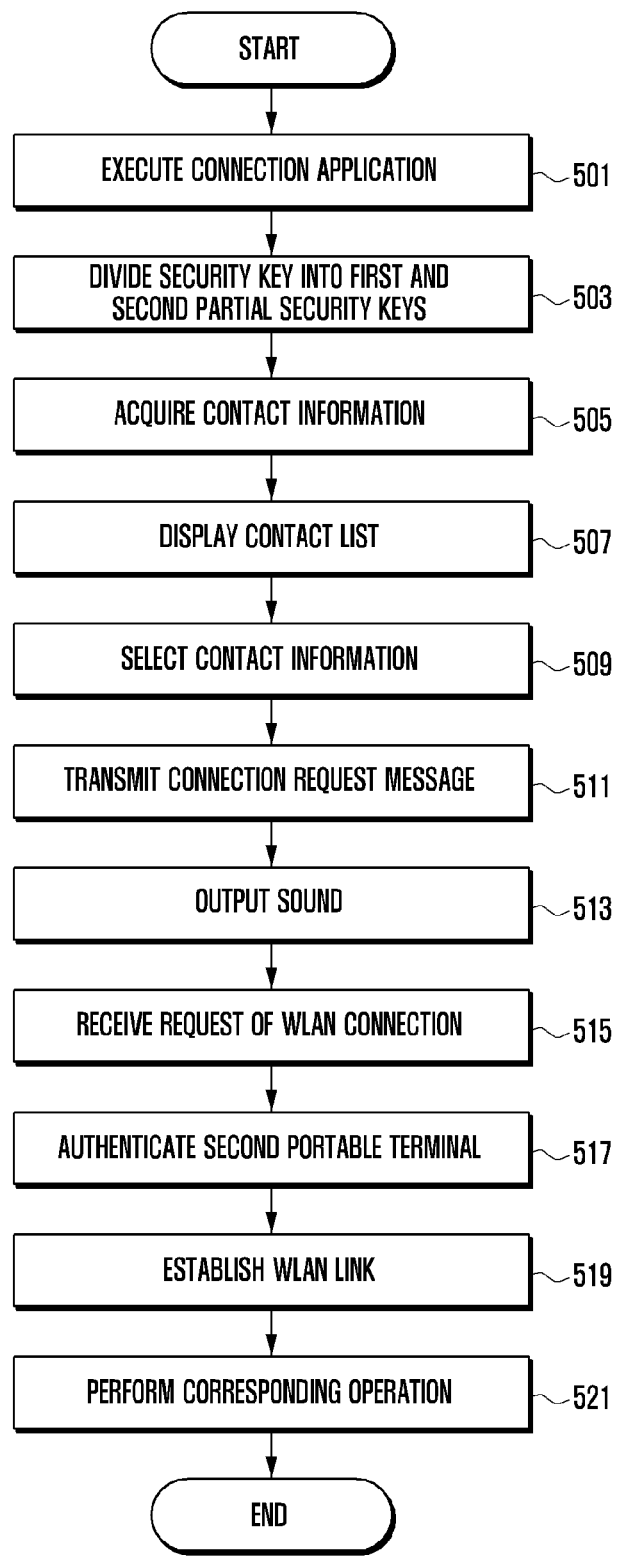
FIG. 5 is a flow chart illustrating a control method when a portable terminal operates as a transmitter portable terminal according to an exemplary embodiment.

FIG. 5 is a flow chart illustrating a control method when a portable terminal operates as a transmitter portable terminal according to an exemplary embodiment.

A transmitter portable terminal (e.g., first portable terminal 100) initiates a procedure of establishing a WLAN link with a receiver portable terminal (e.g., second portable terminal 300). That is, the transmitter portable terminal performs a function of the first portable terminal 100 and the receiver portable terminal performs a function of the second portable terminal 300, as described above with reference to FIGS. 1 to 4. The second portable terminal 300 may be one of a portable terminal 310, a portable terminal 320, and a portable terminal 330, or may include at least two of the portable terminal 310, the portable terminal 320, and the portable terminal 330.

Referring to FIG. 5, the controller 370 executes a connection application according to user input (operation 501). Upon the execution of the connection application, the controller 370 divides one first security key into a first partial security key and a second partial security key (operation 503). The first security key, the first partial security key, and the second partial security key may be previously stored. As described above, upon the execution of the connection application, the first partial security key and the second partial security key may be configured by the second security key or a new security key.

As the connection application is executed, the controller 370 acquires contact information from the contact server 200 through a cellular network 400 (operation 505). The controller 370 displays a contact list based on the acquired contact information on a screen (operation 507).

If user selection with respect to at least one contact information item from the contact list is input (operation 509), the controller 370 transmits a connection request message to the contact server 200 (operation 511). The user may select at least one contact information from the contact list using a user input unit 318. When the at least one contact information is selected, the controller 370 may generate the connection request message including a first partial security key among partial security keys divided from the first security key and connection information for the WLAN connection and transmit the connection request message to the contact server 200.

The controller 370 controls output of a sound into which the partial security key is loaded after transmission of the connection request message (operation 513). The controller 370 may output a sound in which a second partial security key among partial security keys divided from the first security key is loaded according a preset output level. The controller 370 may wait for a preset appointed time after transmission of the connection request message and then output the sound, and may periodically output the sound according to a preset period when the connection request message is transmitted.

When receiving a request of WLAN connection from the at least one second portable terminal 300 (operation 515), the controller 370 authenticates a second portable terminal 300 having requested the WLAN connection (operation 517). The controller 370 acquires a second security key provided from the second portable terminal 300 together with the request of the WLAN connection, and may authenticate the second portable terminal 300 by comparing the second security key with the first security key.

When the authentication with respect to the second portable terminal 300 is normally completed, that is, when the second security key corresponds to the first security key, the controller 370 establishes the WLAN link with the second portable terminal 300 (operation 519). That is, the second portable terminal 300 may request the WLAN connection to the first portable terminal 100 using a second security key being a combination of a first partial security key acquired from the connection request message and a second partial security key acquired from the sound, and connection information acquired from the connection request message. Then, the first portable terminal 100 may authenticate the second portable terminal 300, and may establish the WLAN link with the second portable terminal 300 according to the result.

Upon establishing the WLAN link with the second portable terminal 300, the controller 370 controls performing a corresponding operation according to a user request (operation 521). For example, the controller 370 may transmit (stream) data according to user selection to the second portable terminal 300 with which the WLAN link is established.

FIGS. 6 to 9 are diagrams illustrating examples of an operation screen of a first portable terminal according to an exemplary embodiment.

Figure 6:
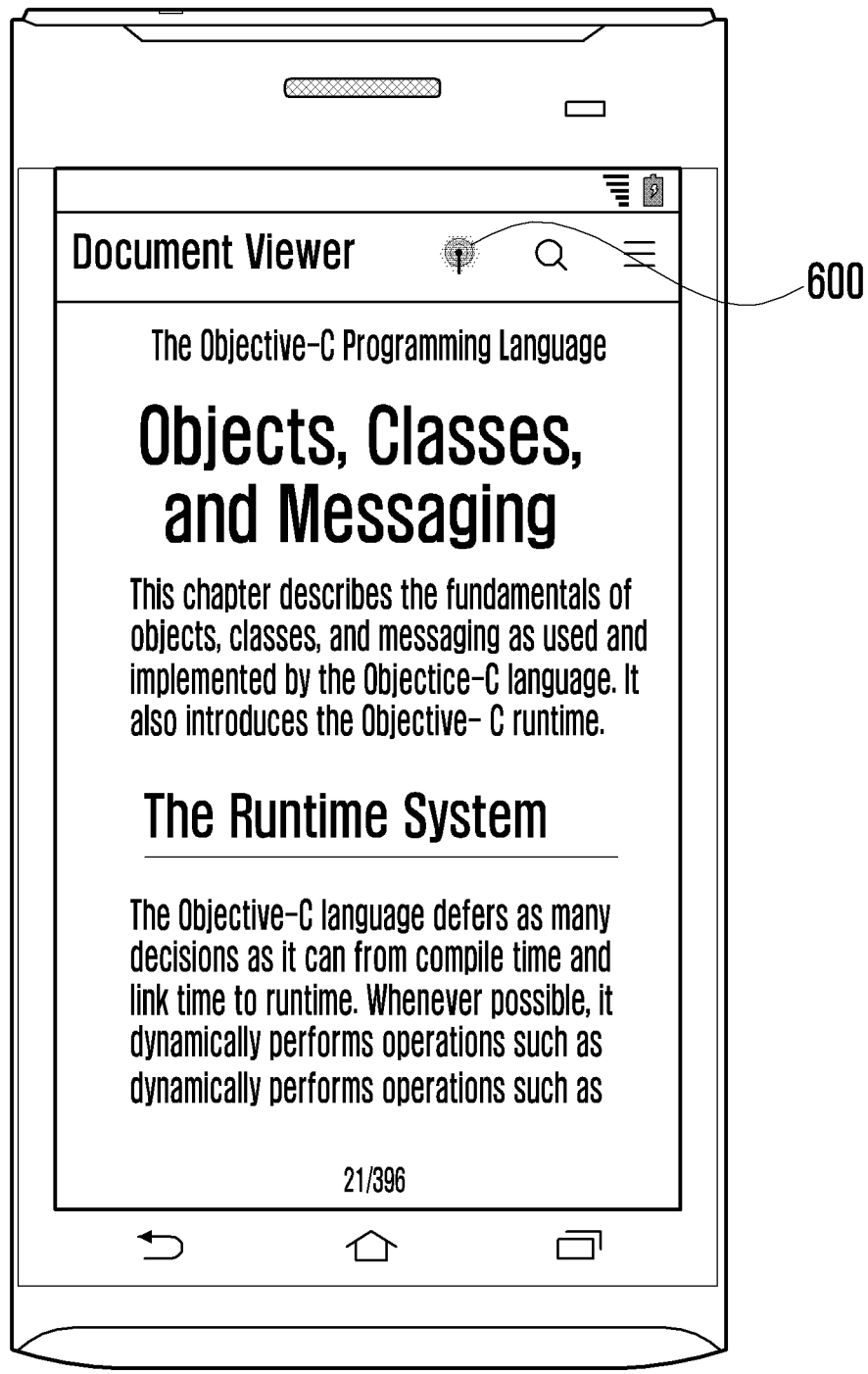
FIGS. 6, 7, 8, and 9 are diagrams illustrating examples of an operation screen of a first portable terminal according to an exemplary embodiment.

FIGS. 6 to 9 illustrate that a first user initiates a service for establishing the WLAN link using a WLAN connection button 600 while confirming a document through a document viewer application as shown in FIG. 6.

Figure 7:
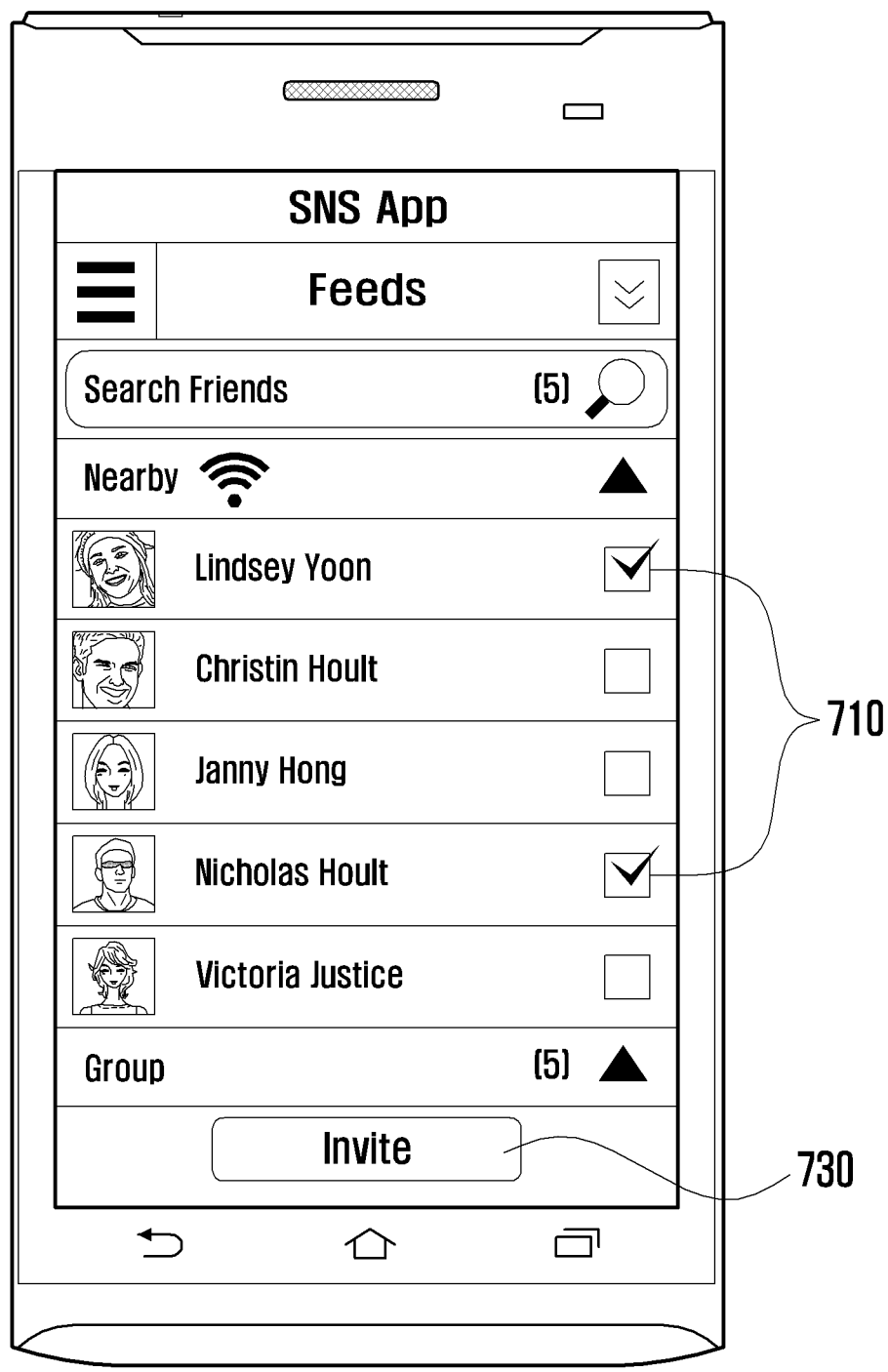
Figure 8:
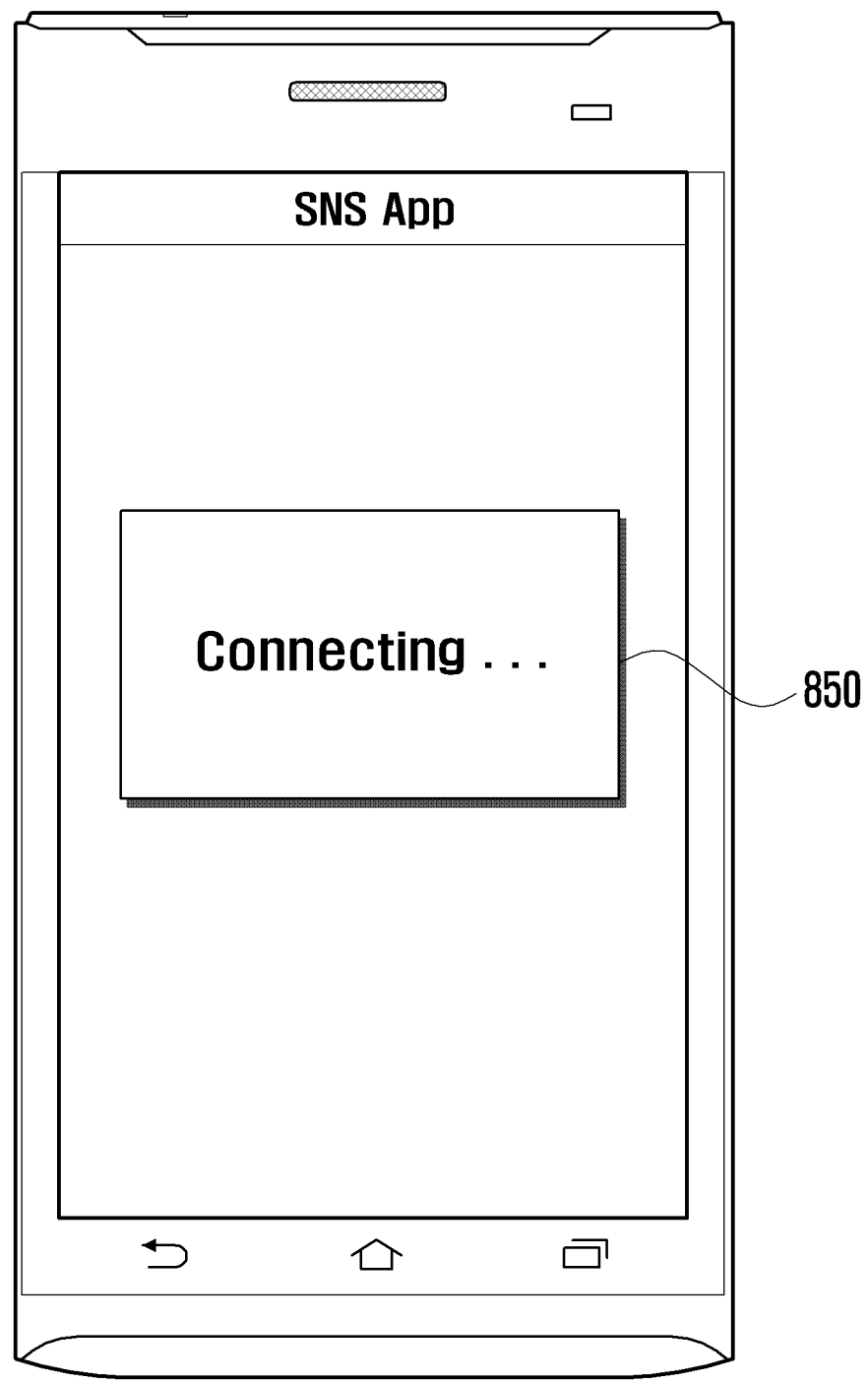
Figure 9:
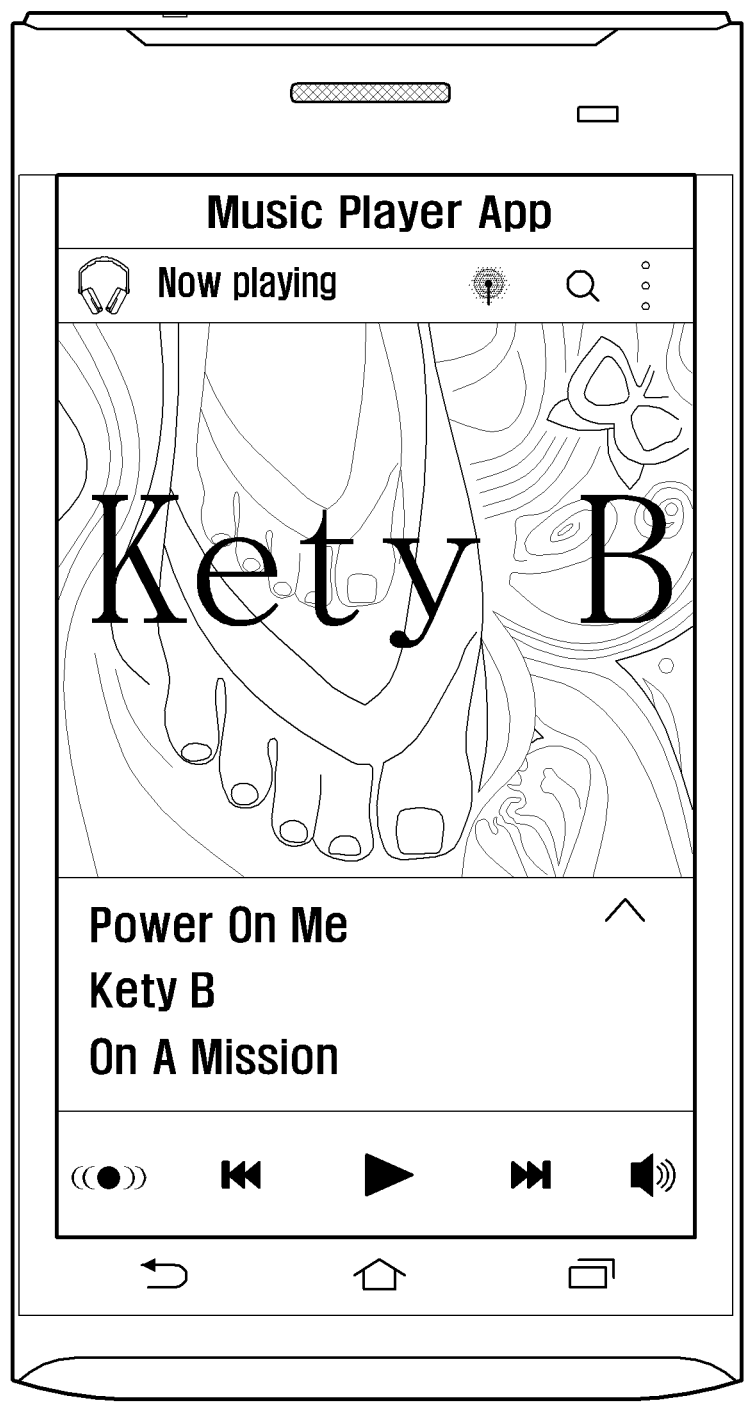

FIG. 9 illustrates that the first user transmits (or streams) the music to a second user when the first user establishes a WLAN link with at least one second user selected from the contact list as shown in FIG. 7. That is, FIGS. 6 to 9 illustrate an operation when a music application is executed to share the music with another user located at a neighboring zone while the first user reads the document based on a document view application. According to exemplary embodiments of FIGS. 6 and 7, the first user may directly share a read document with the second user by a document view application or may directly share a listened music with the second user by the music playback application.

FIG. 6 illustrates an example of a screen of the first portable terminal 100 when a user of the first portable terminal 100 executes a connection application. As shown in FIG. 6, the connection application is a document view application. That is, FIG. 6 illustrates a state where the user executes the document view application and confirms a document using the executed document view application. Upon the execution of the document view application, a function of the connection application, that is, an operation of establishing the WLAN link may be automatically performed. A separate WLAN connection button 600 is provided at one region of a screen of the document view application, and accordingly an operation for establishing the WLAN link may be initiated. The WLAN connection button 600 is illustrated as an icon in FIG. 6, but may be provided as text, or a combination of an icon and text according to an implementation.

Accordingly, the first portable terminal 100 executes a document view application according to an operation scheme of the connection application, or receives contact information related to a user of the first portable terminal 100 from the contact server 200 through the cellular network 400 when establishment of the WLAN link is requested on a screen of the document view application according to the WLAN connection button 600.

The first portable terminal 100 displays a contact list screen as shown in FIG. 7 using the received contact information. That is, a screen of the first portable terminal 100 shown in FIG. 6 is converted to a screen shown in FIG. 7 according to reception of information.

As shown in FIG. 7, the first portable terminal 100 display a contact list composed of contact information located at a neighboring zone of the user below an item <Nearby>. That is, when providing the contact list, contact information with respect to the second portable terminal 300 located in a zone neighboring a location of the first portable terminal 100 may be provided. The contact list may include contact information by specific groups according to user setting below an item <Group>, and may be indicated on a screen according to user input (e.g., scroll).

The user may select contact items 710 of Lindsey Yoon and Nicholas Hoult from a contact list displayed on a screen in order to form a WLAN link with Lindsey Yoon and Nicholas Hoult.

The user may input an <Invite> button 730 in order to request WLAN connection with selected portable terminals, that is, second portable terminals 300 of Lindsey Yoon and Nicholas Hoult. Then, according to the <Invite> button 730 input of the user, a screen of first portable terminal 100 shown in FIG. 7 may be converted into a screen as shown in FIG. 8.

FIG. 8 illustrates an example of a screen of the first portable terminal 100 while the first portable terminal 100 establishes the WLAN link with the second portable terminal 300. That is, when the first portable terminal 100 establishes the WLAN link, a state window 850 indicating that the first portable terminal 100 connects to the second portable terminal 300 may be displayed on a screen of the first portable terminal 100 as illustrated in FIG. 8. The state window 850 may be displayed on a separate screen as illustrated in FIG. 8 or may be displayed on a screen of FIG. 7 in the pop-up form. The first portable terminal 100 may output the sound into which a partial security key is loaded through a speaker 341 together with display of a screen as described above, and may wait for reception of a WLAN connection request from the second portable terminal 300.

If the first portable terminal 100 connects with the second portable terminal 300, that is, when a WLAN link is established, a screen of the first portable terminal 100 may be converted into a previously displayed screen as illustrated in FIG. 7, and an execution screen of another application (e.g., music playback application) according to user request may be displayed like a screen of the first portable terminal 100 shown in FIG. 9. That is, the user may execute a music playback application sharing the music with Lindsey Yoon and Nicholas Hoult at a neighboring zone in which a WLAN link is established.

As shown in FIG. 9, if the WLAN link is established with the second portable terminal 300 through the WLAN 400, the first portable terminal 100 may execute a music playback application corresponding to a user request. The music playback application may transmit the music selected by the user of the portable terminal 100 to the second portable terminal 300 through the WLAN link in a streaming operation. That is, the first portable terminal 100 may stream the music to Lindsey Yoon and Nicholas Hoult between which the WLAN link is established.

If the WLAN link is established, the first portable terminal 100 and the second portable terminal 300 does not require use of an interface for a mobile communication network for exchanging data with each other. Accordingly, the first portable terminal 100 and the second portable terminal 300 may deactivate a communication function through a mobile communication network after the WLAN link is established.

Figure 10:
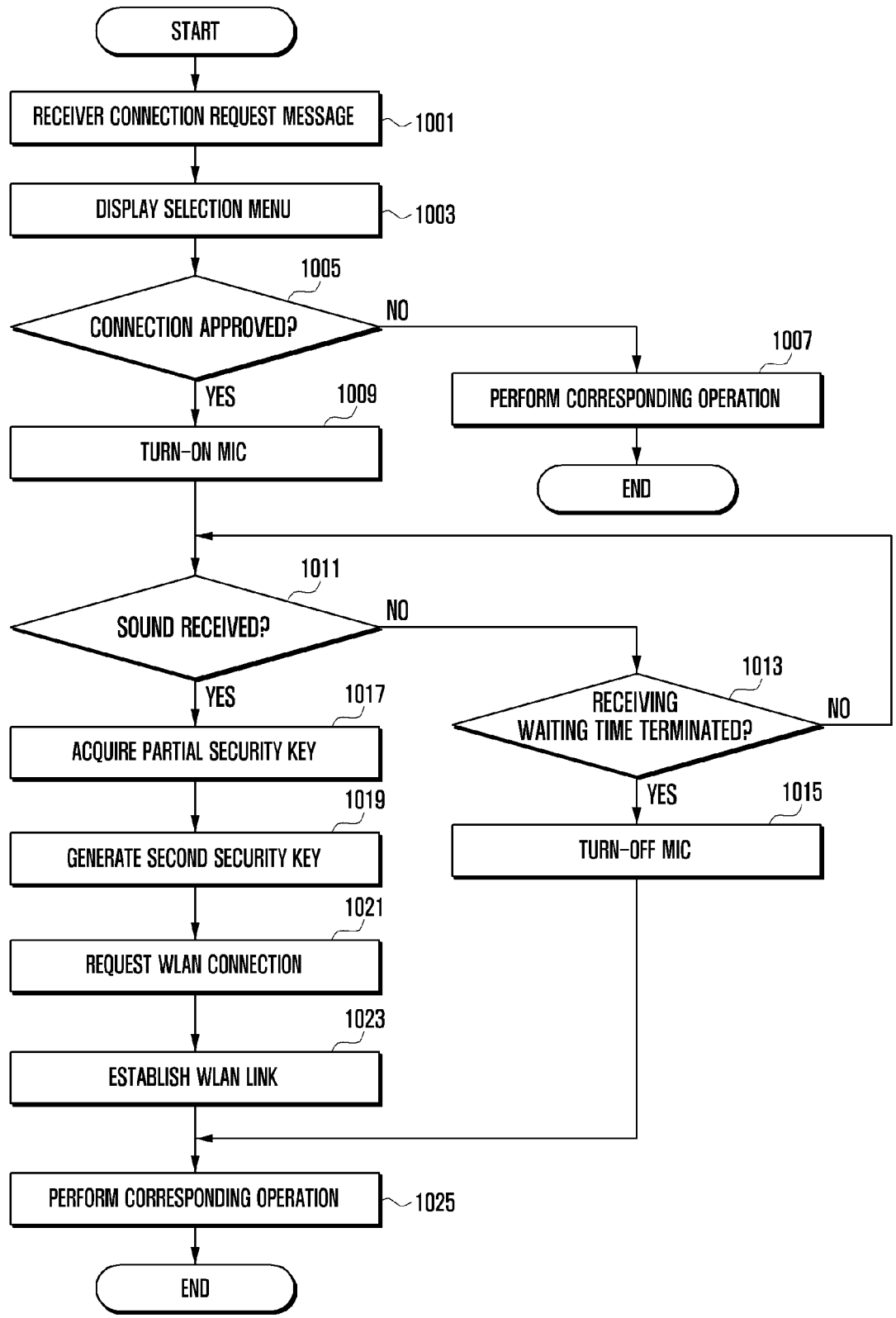
FIG. 10 is a flow chart illustrating a control method when a portable terminal operates as a receiver portable terminal according to an exemplary embodiment.

FIG. 10 is a flow chart illustrating a control method when a portable terminal operates as a receiver portable terminal according to an exemplary embodiment.

Referring to FIG. 10, when receiving a connection request message from a contact server 200 (operation 1001), the controller 370 may display a selection menu confirming whether to connect with the first portable terminal 100 with reference to the connection request message on a screen (operation 1003).

The controller 370 determines whether a connection approval input of the user is received in the selection menu (operation 1005).

If receiving a connection rejection input of the user in the selection menu (NO of operation 1005), the controller 370 controls performing a corresponding operation (operation 1007). For example, the controller 370 may return to an operation before the selection menu is displayed and may display a previous screen. For example, if an image before display of the selection menu is displayed, a corresponding image is again displayed. If a game is executed, a corresponding game screen may be again displayed.

If the connection approval input is received in the selection menu (YES of operation 1005), the controller 370 turns-on a microphone 343 (operation 1009). When the microphone 343 is turned-on, the controller 370 may start counting a receiving waiting time. The receiving waiting time indicates a time waiting an input of a sound output from the first portable terminal 100, and a waiting time may be set to various values according to user input.

The controller 370 determines whether the sound is received (operation 1011). The controller 370 may check whether a sound output from the first portable terminal 100 is input through the microphone 343. The controller 370 determines whether the input sound includes a partial security key. If the input sound does not include the partial security key, the process goes to operation 1013.

When the sound is not received (NO of operation 1011), the controller 370 determines whether the receiving waiting time is terminated (operation 1013). If the receiving waiting time is not terminated (NO of operation 1013), the controller 370 goes to operation 1011 and repeats the above-described procedures. If the receiving waiting time is terminated (YES of operation 1013), the controller 370 turns-off the microphone 343 (operation 1015). The controller 370 may control performing a corresponding operation after the microphone is turned-off (operation 1025). For example, the controller 370 may control screen display of a previous step.

When the sound is received (YES of operation 1011), the controller 370 acquires a partial security key (operation 1017). If the sound output from the first portable terminal 100 is input through the microphone 343, the controller 370 may acquire a first partial security key from the connection request message, and may acquire a second partial security key from the sound. FIG. 10 illustrates that the first partial security key and the second partial security key are acquired when the sound is received, but the first partial security key may be acquired when the connection request message is received, when a connection approval input according to the selection menu is received, or when the microphone 343 is turned-on.

The controller 370 combines the second partial security key with the first partial security key to generate one second security key (operation 1019). The controller 370 requests WLAN connection to the first portable terminal 100 using the connection information of the connection request message and the second security key (operation 1021). That is, the controller 370 may request the WLAN connection to the first portable terminal 100 with reference to the connection information, and may transmit the second security key as a security key for requesting the WLAN connection. The controller 370 may identify a first portable terminal 100 having transmitting a sound from connection information of the first portable terminal 100 acquired upon reception of a connection request message.

According to a WLAN connection request approval of the first portable terminal 100, the controller 370 establishes the WLAN link with the first portable terminal 100 (operation 1023). For example, to establish the WLAN link, the controller 370 may request WLAN connection to the first portable terminal 100 through a WLAN interface. Accordingly, when a WLAN function is turned-off, the controller 370 may activate a WLAN function of the second portable terminal 300.

Upon establishment of the WLAN link with the first portable terminal 100, the controller 370 controls performing a corresponding operation (operation 1025). When receiving data transmitted (streamed) from the first portable terminal 100 through the WLAN link, the controller 370 may play the received data. The controller 370 determines whether an application ID is included in the connection information of the connection request message. When the application ID is included in the connection information of the connection request message, the controller 370 may execute a connection application designated by the application ID. The controller 370 may use various services (e.g., music streaming) using the executed connection application together with the first portable terminal 100.

Figure 11:
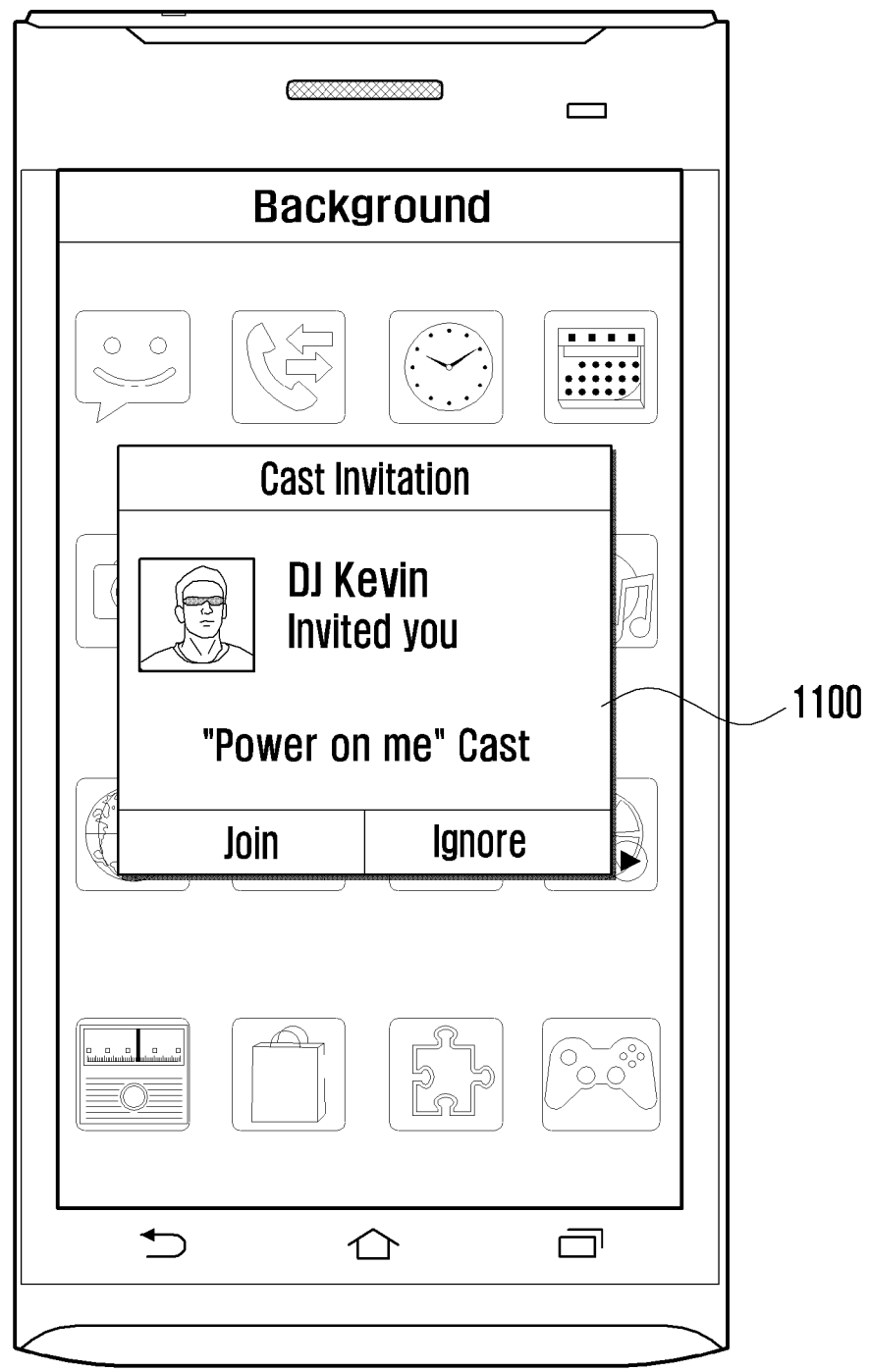
FIGS. 11, 12, and 13 are diagrams illustrating examples of an operation screen of a second portable terminal according to an exemplary embodiment.
Figure 12:
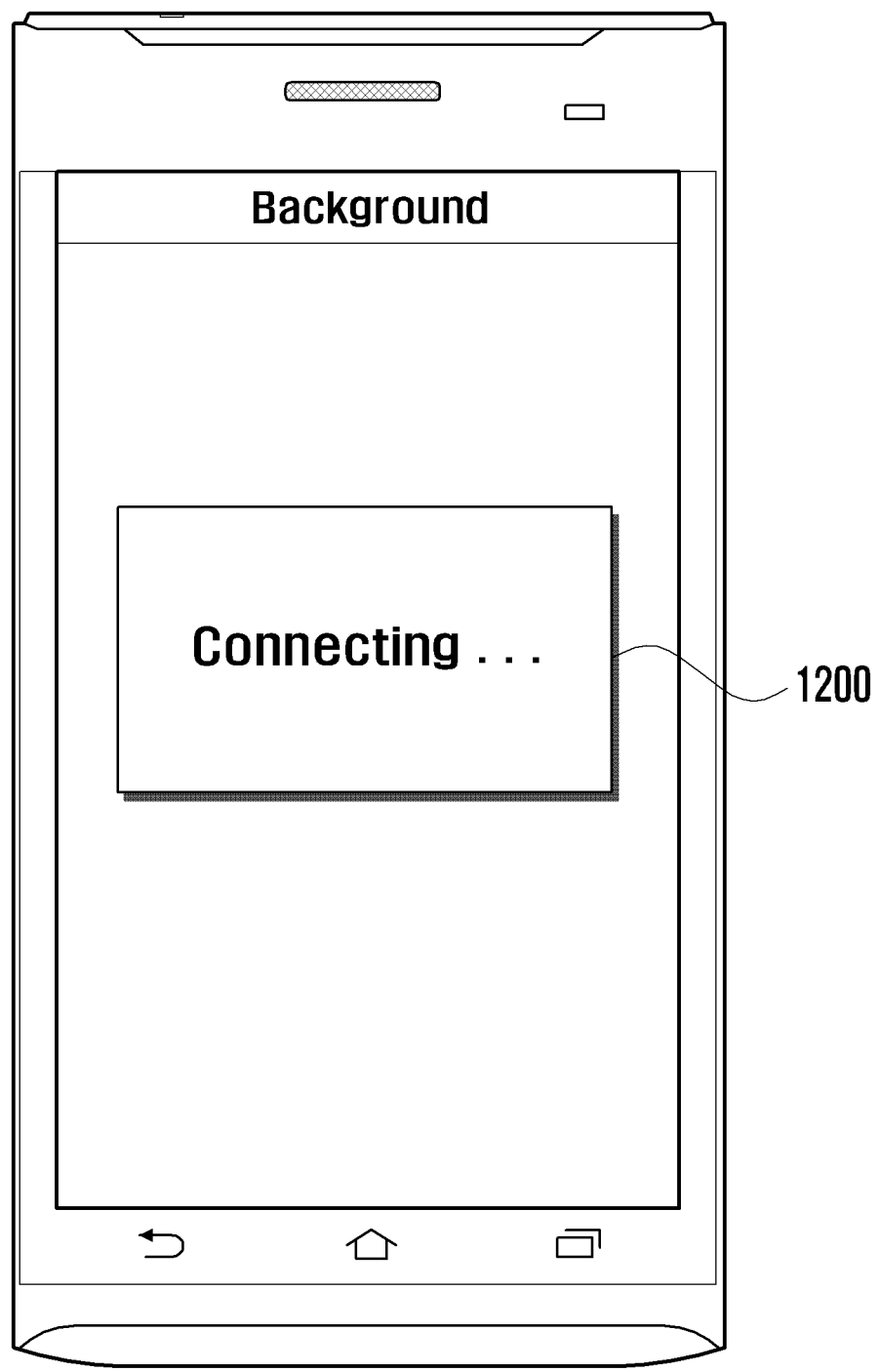
Figure 13:

FIGS. 11 to 13 are diagrams illustrating examples of an operation screen of a second portable terminal according to an exemplary embodiment.

FIG. 11 illustrates an example of a screen of the second portable terminal 300 when the contact server 200 pushes the connection request message to the second portable terminal 300 through a cellular network 400. It is assumed that a user (e.g., DJ Kevin) of the first portable terminal 100 connects with a user of the second portable terminal 300 through the WLAN 400 when a background is displayed on the second portable terminal 300.

As shown in FIG. 11, when the contact server 200 pushes the connection request message to the second portable terminal 300 in response to a request from the first portable terminal 100, the second portable terminal 300 displays a selection menu 110 on a screen in a pop-up form. That is, the second portable terminal 300 may display a menu for confirming whether to accept invitation of the first portable terminal 100.

Since the first portable terminal 100 and the second portable terminal 300 register user information (e.g., contact point, user name) to each other, if the invitation is requested from the first portable terminal 100, the second portable terminal 300 outputs user information of the first portable terminal 100 so that the user of the second portable terminal 300 may know that a user requesting invitation through the output user information is a user (e.g., DJ Kevin) of the first portable terminal 100. The first portable terminal 100 may provide metadata (e.g., information indicating a type of content which the first portable terminal 100 will transmit (stream)) capable of identifying contents transmitted (streamed) when requesting invitation to the second portable terminal 300.

Accordingly, if the invitation is received from the first portable terminal 100, the second portable terminal 300 may display a selection menu 1100 including user information (e.g., DJ Kevin) of the first portable terminal 100, contents information, and a <Join> and <Ignore> buttons for receiving a selection of connection approval or rejection, in the pop-up form. The number and types of items provided through the selection menu 1100 may be changed according to the implementation.

When the user selects (e.g., touches) an <Ignore> button on the selection menu 1110 in the screen of the second portable terminal 300, the screen of the second portable terminal 300 may return to a previous screen, that is, a background screen. When the <Ignore> button is selected, the second portable terminal 300 may transmit a rejection message rejecting connection to the first portable terminal 100.

If the user selects (e.g., touches) a <Join> button on the selection menu 1100 in the screen of the second portable terminal 300, the screen of the second portable terminal 300 may be converted as shown in FIG. 12.

FIG. 12 illustrates an example of a screen of the second portable terminal 300 while the second portable terminal 300 establishes the WLAN link with the first portable terminal 100. As shown in FIG. 12, while the second portable terminal 300 establishes the WLAN link with the first portable terminal 100, a state window 1200 indicating that the second portable terminal 300 connects with the first portable terminal 100 through the WLAN may be displayed on a screen of the second portable terminal 300. The state window 1200 may be displayed on a separate screen as shown in FIG. 12, or may be displayed on a screen of FIG. 11 in the pop-up form. That is, the state window 1200 shown in FIG. 12 may be displayed on a background screen instead of the selection menu 1100 of FIG. 11 in the pop-up form. The second portable terminal 300 may generate a second security key together with display of the screen as described above, and may request WLAN connection to the first portable terminal 100 based on the second security key and the connection information.

Meanwhile, if the first portable terminal 100 connects with the second portable terminal 300, that is, when a WLAN link is established, a screen of the first portable terminal 100 may be converted into a previously displayed screen as illustrated in FIG. 11, and an execution screen of another application according to a request from the first portable terminal 100 may be displayed like a screen of the second portable terminal 300 shown in FIG. 13.

FIG. 13 illustrates a screen which the second portable terminal 300 executes a corresponding connection application (e.g., music playback application) with reference to an application ID included in the connection information after connecting with the first portable terminal 100 through the WLAN. That is, as shown in FIG. 13, the second portable terminal 300 may receive and display a music file transmitted (streamed) from the first portable terminal 100. For example, when the user selects a <Join> button from the selection menu 1100, the second portable terminal 300 may execute a music playback application. The second portable terminal 300 may play a music file transmitted (or streamed) from the first portable terminal 100 through a music playback application to display a music playback screen as shown in FIG. 13.

If the WLAN link is established, the first portable terminal 100 and the second portable terminal 300 do not require use of an interface for a mobile communication network for exchanging data with each other. Accordingly, the first portable terminal 100 and the second portable terminal 300 may deactivate a communication function through a mobile communication network after the WLAN link is established.

The foregoing exemplary embodiments may be implemented in an executable program command form by various computer means and be recorded in a computer-readable recording medium. The computer-readable recording medium may include a program command, a data file, and a data structure individually or a combination thereof. In the meantime, the program command recorded in a recording medium may be specially designed or configured or be known to a person having ordinary skill in a computer software field to be used. The computer-readable recording medium includes Magnetic Media, such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, and flash memory, storing and executing program commands. Further, the program command includes a machine language code created by a compiler and a high-level language code executable by a computer using an interpreter. The foregoing hardware device may be configured to be operated as at least one software module to perform an operation, and vice versa.

As described above, according to the method and the system for establishing a WLAN link between portable terminals of an exemplary embodiment, the user may establish a WLAN link representing reinforced security stability by only a simple operation. An exemplary embodiment may divide a security key, in establishing a WLAN link between portable terminals, and provide the divided security keys separately.

Particularly, a transmitter portable terminal initiating a service may divide one security key into at least two such as a first partial security key and a second security key, and output the divided partial security keys through the cellular network and a sound. Then, the receiver portable terminal combines the second partial security key acquired through the sound with the first partial security key acquired through the cellular network to generate a security key for establishing the WLAN link with the transmitter portable terminal.

As described above, when providing the security key for establishing the WLAN link between the portable terminals, a part of the security key is provided through the cellular network and a remaining part of a security key is provided through the sound, so that exposure of the security key due to external hacking of the contact server and unintended establishment of the WLAN due to unintended sound reception of another user can be prevented. That is, when establishing the WLAN link between the portable terminals, reinforced security stability can be provided, and illegal establishment of the WLAN link from unintended users or external hacking can be prevented.

Exemplary embodiments may be implemented in various types of portable terminals and various devices corresponding thereto. In addition, exemplary embodiments can improve convenience, usability, and competitive force of the portable terminals by implementing optimal environments for establishing the WLAN link.

The described-above exemplary embodiments and advantages are merely exemplary and are not to be construed as limiting. The present teaching can be readily applied to other types of apparatuses. The description of exemplary embodiments is intended to be illustrative, and not to limit the scope of the claims, and many alternatives, modifications, and variations will be apparent to those skilled in the art.

What is claimed is:

1. A method of establishing a wireless local area network (WLAN) link in a portable terminal, the method comprising:
   transmitting a connection request message including a first partial security key being a portion of a first security key to a second portable terminal through a cellular network, by a first portable terminal;
   outputting a sound including a second partial security key being a remaining portion of the first security key, after transmitting the connection request message;
   receiving a request of a WLAN connection including a second security key from the second portable terminal having received the sound through a WLAN; and
   establishing the WLAN link with the second portable terminal when the second security key corresponds to the first security key,
   wherein the second partial security key is loaded into the sound.

2. The method of claim 1, wherein the transmitting the connection request message comprises:
   acquiring contact information of a plurality of second terminals of a neighboring zone;
   displaying a contact list based on the contact information of the plurality of second terminals; and
   receiving an input for selecting at least one second portable terminal from the contact list.

3. The method of claim 2, wherein the acquiring the contact information comprises acquiring the contact information from a contact server, by the first portable terminal.

4. The method of claim 2, wherein the acquiring the contact information comprises acquiring the contact information from a memory of the first portable terminal.

5. The method of claim 3, further comprising transmitting the connection request message to the contact server, by the first portable terminal,
   wherein the contact server pushes the connection request message to the second portable terminal.

6. The method of claim 1, further comprising dividing the first security key into the first partial security key and the second partial security key.

7. The method of claim 1, wherein the outputting the sound comprises:
   determining an output level of the sound; and
   outputting the sound according to the determined output level.

8. The method of claim 1, further comprising receiving a user input for establishing the WLAN link.

9. A method of establishing a wireless local area network (WLAN) link in a portable terminal, the method comprising:
   receiving a connection request message from a contact server through a cellular network via a push operation, by a second portable terminal;
   turning-on a microphone for receiving a sound output from a first portable terminal, in response to the connection request message;
   receiving the sound output from the first portable terminal through the microphone;
   acquiring a first partial security key according to the connection request message and a second partial security key according to the sound;
   combining the second partial security key with the first partial security key to acquire a security key; and
   requesting a WLAN connection to the first portable terminal using the acquired security key,
   wherein the second partial security key is loaded into the sound.

10. The method of claim 9, wherein the turning-on the microphone comprises:
    displaying a selection menu for receiving an approval of the WLAN connection, when the connection request message is received; and
    turning-on the microphone when the approval of the WLAN connection is input through the selection menu.

11. The method of claim 9, further comprising acquiring connection information for the WLAN connection from the connection request message.

12. The method of claim 11, wherein the requesting the WLAN connection comprises:
    identifying the first portable terminal transmitting the connection request message based on the connection information; and
    transmitting the security key to the first portable terminal to request the WLAN connection.

13. The method of claim 9, wherein the requesting the WLAN connection comprises requesting the WLAN connection by using the cellular network or a WLAN.

14. A first portable terminal comprising:
    a memory which stores a program; and
    a controller which executes the program to establish a wireless local area network (WLAN) link with a second portable terminal,
    wherein the program comprises commands which, when executed by the controller, cause the controller to execute a method comprising:
    transmitting a connection request message including a first partial security key being a portion of a first security key to the second portable terminal through a cellular network;
    outputting a sound including a second partial security key being a remaining portion of the first security key, after transmitting the connection request message;
    receiving a request of a WLAN connection including a second security key from the second portable terminal having received the sound through a WLAN; and
    establishing the WLAN link with the second portable terminal when the second security key corresponds to the first security key,
    wherein the second partial security key is loaded into the sound.

15. The first portable terminal of claim 14, wherein the outputting the sound comprises:
    determining an output level of the sound; and
    outputting the sound according to the determined output level.

16. The first portable terminal of claim 14, wherein the transmitting the connection request message comprises:
 displaying a contact list corresponding to a plurality of second portable terminals, based on contact information of the plurality of second portable terminals of a neighboring zone acquired from a contact server; and
 transferring the first partial security key and the second partial security key to a respective second portable terminal through the cellular network and the sound, respectively, when receiving an input for selecting the respective second portable terminal from the contact list.

17. A first portable terminal comprising:
 a memory which stores a program; and
 a controller which executes the program to control establishment of a wireless local area network (WLAN) link with a second portable terminal,
 wherein the program comprises commands which, when executed by the controller, cause the controller to execute a method comprising:
 turning-on a microphone for receiving a sound output from the second portable terminal in response to a connection request message received from a contact server via a push operation;
 receiving the sound output from the second portable terminal through the microphone;
 acquiring a first partial security key according to the connection request message and a second partial security key according to the sound received from the second portable terminal;
 combining the second partial security key with the first partial security key to acquire a security key; and
 requesting WLAN connection to the second portable terminal using the acquired security key, and
 wherein the second partial security key is loaded into the sound.

18. The first portable terminal of claim 17, wherein the turning-on the microphone comprises:
 displaying a selection menu for receiving a confirmation that the WLAN connection is approved, when receiving the connection request message; and
 turning-on the microphone to receive the sound from the second portable terminal when the WLAN connection is approved.

19. The first portable terminal of claim 18, wherein the connection request message comprises the first partial security key being a portion of the security key and connection information for the WLAN connection, and the method further comprises:
 identifying the second portable terminal transmitting the connection request message based on the connection information; and
 transmitting the security key to the second portable terminal to request the WLAN connection.

20. A non-transitory computer-readable recording medium storing a program that, when executed by a computer, causes the computer to execute a method comprising:
 transmitting a first partial security key and a second partial security key, which have been divided from a first security key, through a cellular network and by a sound, respectively;
 combining the first and second partial security keys, which have been received through the cellular network and by the sound, with each other to generate a second security key; and
 establishing a wireless local area network link using the first security key and the second security key,
 wherein the transmitting comprises outputting the first partial security key and the second partial security key, and the security key is loaded into the sound.

* * * * *